US012731794B2

(12) United States Patent
Zhang et al.

(10) Patent No.: US 12,731,794 B2
(45) Date of Patent: Sep. 8, 2026

(54) 4H/FCC HETEROPHASE PLATINUM BASED NANOMATERIAL ON NANOROD FOR ELECTROCATALYTIC ALCOHOL OXIDATION

(71) Applicant: City University of Hong Kong, Hong Kong (HK)

(72) Inventors: Hua Zhang, Hong Kong (HK); Zhen He, Hong Kong (HK); Lingwen Liao, Hefei (CN)

(73) Assignee: City University of Hong Kong, Hong Kong (HK)

( * ) Notice: Subject to any disclaimer, the term of this patent is extended or adjusted under 35 U.S.C. 154(b) by 625 days.

(21) Appl. No.: 18/338,379

(22) Filed: Jun. 21, 2023

(65) Prior Publication Data

US 2024/0429402 A1 Dec. 26, 2024

(51) Int. Cl.

| | |
|---|---|
| ***H01M 4/92*** | (2006.01) |
| ***H01M 4/86*** | (2006.01) |
| ***H01M 8/1011*** | (2016.01) |

(52) U.S. Cl.

CPC ......... *H01M 4/925* (2013.01); *H01M 4/8657* (2013.01); *H01M 4/921* (2013.01); *H01M 8/1011* (2013.01); *H01M 2004/8684* (2013.01)

(58) Field of Classification Search

CPC .... H01M 4/925; H01M 4/8657; H01M 4/921; H01M 8/1011; H01M 4/92; H01M 4/88; H01M 4/8825

See application file for complete search history.

(56) References Cited

PUBLICATIONS

Wang et al., "Crystal phase-controlled growth of PtCu and PtCo alloys on 4H Au nanoribbons for electrocatalytic ethanol oxidation reaction", Nano Research, Published Apr. 30, 2020, vol. 13 (7), pp. 1970-1975 (Year: 2020).*

Zhiming Cui et al., "Synthesis of structurally ordered Pt3Ti and Pt3V nanoparticles as methanol oxidation catalysts," Journal of the American Chemical Society, 2014, vol. 136 (29), pp. 10206-10209.

Zhanxi Fan et al., "Synthesis of 4H/fcc Noble Multimetallic Nanoribbons for Electrocatalytic Hydrogen Evolution Reaction," Journal of the American Chemical Society, 2016, vol. 138 (4), pp. 1414-1419.

(Continued)

*Primary Examiner* — Stewart A Fraser

(74) *Attorney, Agent, or Firm* — Idea Intellectual Limited; Sam T. Yip

(57) ABSTRACT

A heterogeneous catalyst for alcohol oxidation reaction of an anode reaction in direct alcohol fuel cells is provided. The catalyst includes at least one Pt-based nanoisland deposited on an Au nanorod by using a synthesis process to form 4H/face-centered cubic (fcc) heterophase. The synthesis process include steps as follows: mixing a material A selected from platinum(II) bis(acetylacetonate), vanadium (III) acetylacetonate, and titanium oxide acetylacetonate with a solvent B selected from oleylamine and 1-octadecene to form a first mixture; adding a dispersion of C 4H/fcc Au nanorods into the first mixture to form a second mixture, in which ratio of A to B is in a range from 0.5 to 2, and a ratio of A to C is in a range from 2 to 6; heating the second mixture; and recovering a 4H/fcc Pt-based heterostructure with Au from the second mixture.

17 Claims, 22 Drawing Sheets

(56) References Cited

PUBLICATIONS

Ye Chen et al., "High-Yield Synthesis of Crystal-Phase-Heterostructured 4H/fcc Au@Pd Core-Shell Nanorods for Electrocatalytic Ethanol Oxidation," Advanced Materials, 2017, vol. 29 (1701331), pp. 1-5.
Injoon Jang et al., "Plasma-induced alloying as a green technology for synthesizing ternary nanoparticles with an early transition metal," Nano Today, 2021, vol. 41 (101316), pp. 1-10.
Yumin Da et al., "Development of a Novel Pt3V Alloy Electrocatalyst for Highly Efficient and Durable Industrial Hydrogen Evolution Reaction in Acid Environment," Advanced Energy Materials, 2023, vol. 13 (2300127), pp. 1-8.
Susan E. Habas et al., "Shaping binary metal nanocrystals through epitaxial seeded growth," Nature Materials, 2007, vol. 6, pp. 692-697.
Lingzheng Bu et al., "Biaxially strained PtPb/Pt core/shell nanoplate boosts oxygen reduction catalysis," Science, 2016, vol. 354 (6318), pp. 1410-1414.
Wenkai Liang et al., "3D Anisotropic Au@Pt—Pd Hemispherical Nanostructures as Efficient Electrocatalysts for Methanol, Ethanol, and Formic Acid Oxidation Reaction," Advanced Materials, 2021, vol. 33 (2100713), pp. 1-8.
Chenlu Xie et al., "Surface and Interface Control in Nanoparticle Catalysis," Chemical Reviews, 2020, vol. 120, pp. 1184-1249.
Jiapeng Zheng et al., "Gold Nanorods: The Most Versatile Plasmonic Nanoparticles," Chemical Reviews, 2021, vol. 121, pp. 13342-13453.
Jiawei Liu et al., "Selective Epitaxial Growth of Rh Nanorods on 2H/fcc Heterophase Au Nanosheets to Form 1D/2D Rh-Au Heterostructures for Highly Efficient Hydrogen Evolution," Journal of the American Chemical Society, 2021, vol. 143, pp. 4387-4396.
Younan Xia et al., "Seed-Mediated Growth of Colloidal Metal Nanocrystals," Angewandte Chemie International Edition, 2017, vol. 56, pp. 60-95.
Cun Zhu et al., "Kinetically Controlled Overgrowth of Ag or Au on Pd Nanocrystal Seeds: From Hybrid Dimers to Nonconcentric and Concentric Bimetallic Nanocrystals," Journal of the American Chemical Society, 2012, vol. 134, pp. 15822-15831.
Guigao Liu et al., "Hydrogen-Intercalation-Induced Lattice Expansion of Pd@Pt Core-Shell Nanoparticles for Highly Efficient Electrocatalytic Alcohol Oxidation," Journal of the American Chemical Society, 2021, vol. 143, pp. 11262-11270.
Hyohyun An et al., "Unusual Rh nanocrystal morphology control by hetero-epitaxially growing Rh on Au@Pt nanowires with numerous vertical twinning boundaries," Nanoscale, 2015, vol. 7, pp. 8309-8314.
Tianou He et al., "Mastering the surface strain of platinum catalysts for efficient electrocatalysis," Nature, 2021, vol. 598, pp. 76-81.
Jessi E. S. van der Hoeven et al., "Unlocking synergy in bimetallic catalysts by core-shell design," Nature Materials, 2021, vol. 20, pp. 1216-1220.
Xichen Zhou et al., "Preparation of Au@Pd Core-Shell Nanorods with fcc-2H-fcc Heterophase for Highly Efficient Electrocatalytic Alcohol Oxidation," Journal of the American Chemical Society, 2022, vol. 144 , pp. 547-555.
Ye Chen et al., "Phase engineering of nanomaterials," Nature Reviews Chemistry, 2020, vol. 4, pp. 243-256.
Zhanxi Fan et al., "Stabilization of 4H hexagonal phase in gold nanoribbons," Nature Communications, 2015, vol. 6 (7684), pp. 1-8.
Junjie Mao et al., "Design of ultrathin Pt—Mo—Ni nanowire catalysts for ethanol electrooxidation," Scienceadvances, 2017, vol. 3 (e1603068), pp. 1-9.
Qipeng Lu et al., "Crystal phase-based epitaxial growth of hybrid noble metal nanostructures on 4H/fcc Au nanowires," Nature Chemistry, 2018, vol. 10, pp. 456-461.
Myao Ge et al., "Phase-Selective Epitaxial Growth of Heterophase Nanostructures on Unconventional 2H-Pd Nanoparticles," Journal of the American Chemical Society, 2020, vol. 142, pp. 18971-18980.
Myao Ge et al., "Seeded Synthesis of Unconventional 2H-Phase Pd Alloy Nanomaterials for Highly Efficient Oxygen Reduction," Journal of the American Chemical Society, 2021, vol. 143, pp. 17292-17299.
Zhanxi Fan et al., "Heterophase fcc-2H-fcc gold nanorods," Nature Communications, 2020, vol. 11 (3293), pp. 1-8.
Xinlong Tian et al., "Engineering bunched Pt-Ni alloy nanocages for efficient oxygen reduction in practical fuel cells," Science, 2019, vol. 366, pp. 850-856.
Lingzheng Bu et al., "Surface engineering of hierarchical platinum-cobalt nanowires for efficient electrocatalysis," Nature Communications, 2016, vol. 7 (11850), pp. 1-8.
Sara E. Skrabalak, "Symmetry in Seeded Metal Nanocrystal Growth," Accounts of Materials Research, 2021, vol. 2, pp. 621-629.
Dingsheng Wang et al., "One-Pot Protocol for Au-Based Hybrid Magnetic Nanostructures via a Noble-Metal-Induced Reduction Process," Journal of the American Chemical Society, 2010, vol. 132, pp. 6280-6281.
Tao Shen et al., "Engineering Ir Atomic Configuration for Switching the Pathway of Formic Acid Electrooxidation Reaction," Advanced Functional Materials, 2022, vol. 32 (2107672), pp. 1-9.
Jing Lu Huang et al., "Formation of Hexagonal-Close Packed (HCP) Rhodium as a Size Effect," Journal of the American Chemical Society, 2017, vol. 139, pp. 575-578.
Ya-Wei Zhou et al., "Probing the enhanced methanol electrooxidation mechanism on platinummetal oxide catalyst," Applied Catalysis B: Environmental, 2020, vol. 280 (119393), pp. 1-9.
Wei Wang et al., "Quatermetallic Pt-based ultrathin nanowires intensified by Rh enable highly active and robust electrocatalysts for methanol oxidation," Nano Energy, 2020, vol. 71(104623), pp. 1-8.
Yan Xia Chen et al., "Formate, an Active Intermediate for Direct Oxidation of Methanol on Pt Electrode," Journal of the American Chemical Society, 2003, vol. 125, pp. 3680-3681.
Takahiro Yajima et al., "Adsorbed water for the electro-oxidation of methanol at Pt—Ru alloy," Chemical Communications, 2003, pp. 828-829.
T. Iwasita, "Electrocatalysis of methanol oxidation," Electrochimica Acta, 2002, vol. 47, pp. 3663-3674.
Lei Gao et al., "Unconventional p-d Hybridization Interaction in PtGa Ultrathin Nanowires Boosts Oxygen Reduction Electrocatalysis," Journal of the American Chemical Society, 2019, vol. 141, pp. 18083-18090.
Haotian Wang et al., "Direct and continuous strain control of catalysts with tunable battery electrode materials," Science, 2016, vol. 354, pp. 1031-1036.
Mufan Li et al., "Single-atom tailoring of platinum nanocatalysts for high-performance multifunctional electrocatalysis," Nature Catalysis, 2019, vol. 2, pp. 495-503.
Yannick Garsany et al., "Experimental methods for quantifying the activity of platinum electrocatalysts for the oxygen reduction reaction," Analytical Chemistry, 2010, vol. 82 (15), pp. 6321-6328.
Chao Wei et al., "Approaches for measuring the surface areas of metal oxide electrocatalysts for determining their intrinsic electrocatalytic activity," Chem. Soc. Rev. 2019, vol. 48, pp. 2518-2534.
Wenchao Sheng et al., "Correlating the hydrogen evolution reaction activity in alkaline electrolytes with the hydrogen binding energy on monometallic surfaces," Energy & Environmental Science, 2013, vol. 6, pp. 1509-1512.
Wenjing Huang et al., "Highly active and durable methanol oxidation electrocatalyst based on the synergy of platinum-nickel hydroxide-graphene," Nature Communications, 2015, vol. 6 (10035), pp. 1-8.
Zhiyuan Qi et al., "Sub-4 nm PtZn Intermetallic Nanoparticles for Enhanced Mass and Specific Activities in Catalytic Electro-Oxidation Reaction," Journal of the American Chemical Society, 2017, vol. 139, pp. 4762-4768.
Xiaobo Yang et al., "Modulating electronic structure of an Au-nanorod-core-PdPt-alloy-shell catalyst for efficient alcohol electro-oxidation," Advanced Energy Materials. 2021, vol. 2100812, pp. 1-10.

(56) References Cited

PUBLICATIONS

Jin Huang et al., "PtCuNi tetrahedra catalysts with tailored surfaces for efficient alcohol oxidation," Nano Letters, 2019, vol. 19, pp. 5431-5436.
Zhicheng Zhang et al., "One-pot synthesis of highly anisotropic five-fold-twinned PtCu nanoframes used as a bifunctional electrocatalyst for oxygen reduction and methanol oxidation," Advanced Materials, 2016, vol. 28, pp. 8712-8717.
Zhiqi Zhang et al., "Single-atom catalyst for high-performance methanol oxidation," Nature Communications, 2021, vol. 12(5235), pp. 1-9.
Faisal Saleem et al., "Elemental Segregation in Multimetallic Core-Shell Nanoplates," Journal of the American Chemical Society, 2019, vol. 141, pp. 14496-14500.
Shouping Chen et al., "High-performance Pt—Co nanoframes for fuel-cell electrocatalysis," Nano Letters, 2020, vol. 20, pp. 1974-1979.
Agus R. Poerwoprajitno et al., "A single-Pt-atom-on-Ru-nanoparticle electrocatalyst for CO-resilient methanol oxidation," Nature Catalysis, 2022, vol. 5, pp. 231-237.
Quanchen Feng et al., "Strain engineering to enhance the electrooxidation performance of atomic-layer Pt on intermetallic Pt3Ga," Journal of the American Chemical Society, 2018, vol. 140, pp. 2773-2776.
Shu-He Han et al., "Porous trimetallic PtRhCu cubic nanoboxes for ethanol electrooxidation," Advanced Energy Materials, 2018, vol. 8 (1801326), pp. 1-10.
Farhat Nosheen et al., "Three-dimensional hierarchical Pt—Cu superstructures," Nano Reseach, 2015, vol. 8, pp. 832-838.
Bo Jiang et al., "Layer-by-layer motif architectures: programmed electrochemical syntheses of multilayer mesoporous metallic films with uniformly sized pores," Angewandte Chemie International Edition, 2017, vol. 129, pp. 1-7.
Jong Wook Hong et al., "Ultrathin free-standing ternary-alloy nanosheets," Angewandte Chemie International Edition, 2016, vol. 55, pp. 2753-2758.
Yao Wang et al., "p-d Orbital hybridization induced by a monodispersed Ga site on a Pt3Mn nanocatalyst boosts ethanol electrooxidation," Angewandte Chemie International Edition, 2022, vol. 61 (e202115735), pp. 1-9.

* cited by examiner

|  | Before MOR | After MOR |
| --- | --- | --- |
| Au at.% | 62.5 | 62.9 |
| Pt at.% | 27.9 | 27.7 |
| V at.% | 9.6 | 9.4 |

4H/FCC HETEROPHASE PLATINUM BASED NANOMATERIAL ON NANOROD FOR ELECTROCATALYTIC ALCOHOL OXIDATION

TECHNICAL FIELD

The present invention generally relates to phase engineering of nanomaterials (PEN) techniques; more specifically, the present invention relates to PEN for epitaxial growth of 4H/face-centered cubic (fcc) heterophase Pt-based nanomaterials on nanorods.

BACKGROUND

Noble-metal-based heterostructures with controllable compositions, morphologies, and interfaces have been extensively studied because of their promising performances in various applications such as catalysis, plasmonics, etc. Among the versatile strategies to synthesize noble-metal-based heterostructures, seeded epitaxial growth has been recognized as one of the most promising methods to realize the precise control of their chemical compositions and morphologies. Moreover, the lattice parameters and electronic configurations of secondary metals could be effectively altered by seeds composed of different metals, which ultimately modulate the properties and functions of heterostructures. For instance, the overgrowth of ultrathin Pt shells on Pd-based nanocubes results in the formation of a core-shell heterostructure, where the lattice structure of Pt can be tuned by lattice expansion and shrinkage of the seeds. Consequently, the lattice variation can tailor the d-band center of Pt and regulate the catalytic performance. However, previous efforts devoted to the controlled epitaxial growth of noble-metal-based heterostructures for promising applications mainly focus on seeds with thermodynamically stable phases.

Recently, the concept of phase engineering of nanomaterials (PEN) has been proposed, which enables the construction of unconventional-phase noble-metal-based heterostructures through seeded epitaxial growth. PEN can provide opportunities to synthesize noble-metal-based heterostructures with unconventional crystal phases, including heterophases, for highly efficient catalysis. However, it remains a challenge to prepare heterophase noble-metal-based heterostructures with controllable compositions and morphologies in order to investigate their structure-dependent catalytic properties.

More importantly, PEN has revealed that tuning the crystal phases of noble-metal heterostructures can efficiently tailor their properties and functions. In particular, owing to the presence of the unconventional phase, phase boundaries, and the synergistic effects between different crystal phases, noble-metal-based heterostructures with heterophases can show great potential in various applications. For example, through epitaxial growth of Ru on the 4H/face-centered cubic (fcc) Au nanowires and Pd on the fcc-2H-fcc Au nanorods, respectively, 4H/fcc hierarchical Au—Ru nanowires and fcc-2H-fcc core-shell Au@Pd nanorods can be constructed. The presence of an unconventional crystal structure and lattice mismatch between the seeds and secondary metals could both alter the electronic configurations of heterostructures, leading to the regulation of catalytic properties. Nevertheless, due to the thermodynamically unstable nature of the unconventional phase, it remains a great challenge to tune the morphologies of heterophase noble-metal-based heterostructures in most previous studies, limiting the comprehensive understanding of the structure-dependent property.

Pt-based nanomaterials are known as promising catalysts in various applications, such as the oxygen reduction reaction (ORR) and alcohol oxidation reaction (AOR) in direct alcohol fuel cells (DAFCs). Until now, tremendous efforts towards the construction of high-performance Pt-based catalysts have been devoted to the precise control of their composition, dimension, and morphology, etc. For example, PtPb@Pt core-shell nanoplates exhibit much-enhanced electrocatalytic activities towards ORR compared to commercial Pt/C, PtPb nanoparticles, and PtPb nanoplates, owing to the simultaneously compressed and expanded lattices of the Pt shell along different axes. However, the crystal phase of Pt nanomaterials, which plays an essential role in determining their intrinsic physicochemical properties, has seldom been explored. In addition, the incorporation of transition metals, such as Ni, Co, etc., into Pt to construct Pt-based alloys has been proven to be an appealing route to reduce the usage of Pt and further boost their catalytic performances. Nevertheless, due to their larger negative reduction potentials, the incorporation of early transition metals (such as V and Ti) into Pt usually requires harsh conditions and thus has rarely been systematically studied. To synthesize Pt alloys containing early transition metals, such as PtV and PtTi, under mild wet-chemical conditions, seeded epitaxial growth could be an effective strategy, considering that heterogeneous nucleation requires a much lower energy barrier compared with that of homogeneous nucleation.

However, as described above, the preparation of heterophase nanomaterials remains challenging due to their thermodynamically unstable nature. For example, although Pt-based alloys containing early transition metals such as titanium (Ti) and vanadium (V) have demonstrated great potential for applications, they are typically prepared under harsh conditions and have not yet been commercialized. Therefore, there is a need to develop a preparation method for the target heterophase nanomaterials that can effectively address these challenges.

SUMMARY OF INVENTION

It is an objective of the present invention to provide an apparatus and a method to address the aforementioned shortcomings and unmet needs in the state of the art.

In accordance with one aspect of the present invention, a heterogeneous catalyst for alcohol oxidation reaction of an anode reaction in direct alcohol fuel cells is provided. The heterogeneous catalyst includes at least one Pt-based nanoisland deposited on an Au nanorod by using a synthesis process to form 4H/face-centered cubic (fcc) heterophase. The synthesis process include steps as follows: mixing a material A selected from platinum(II) bis(acetylacetonate), vanadium(III) acetylacetonate, and titanium oxide acetylacetonate with a solvent B selected from oleylamine and 1-octadecene to form a first mixture; adding a dispersion of C 4H/fcc Au nanorods into the first mixture to form a second mixture, in which A, B, and C are positive and a ratio of A to B is in a range from 0.5 to 2, and a ratio of A to C is in a range from 2 to 6; heating the second mixture at a temperature in a range from 150° C. to 200° C. for a time period in a range from 5 hours to 15 hours; and recovering a 4H/fcc Pt-based heterostructure with Au from the second mixture.

In accordance with one aspect of the present invention, the Pt-based nanoisland epitaxially grows from the Au nanorod so as to form a 4H/fcc core-shell Au—Pt heterostructure with the Au nanorod serving as a seed.

In accordance with one aspect of the present invention, the Pt-based nanoisland further includes vanadium and epitaxially grows from the Au nanorod so as to form a 4H/fcc core-shell Au—PtV heterostructure with the Au nanorod serving as a seed.

In accordance with one aspect of the present invention, the Pt-based nanoisland further includes titanium and epitaxially grows from the Au nanorod so as to form a 4H/fcc core-shell Au—PtTi heterostructure with the Au nanorod serving as a seed.

In accordance with one aspect of the present invention, the Pt-based nanoisland further includes vanadium and epitaxially grows from the Au nanorod so as form to a 4H/fcc heterophase hierarchical Au—PtV heterostructure with the Au nanorod serving as a seed.

In accordance with one aspect of the present invention, the Pt-based nanoisland further includes titanium and epitaxially grows from the Au nanorod so as form to a 4H/fcc heterophase hierarchical Au—PtTi heterostructure with the Au nanorod serving as a seed.

The synthetic strategy presented in this invention for a heterogeneous catalyst is a facile, two-step method that employs mild reaction conditions. This approach offers several advantages, including the avoidance of harsh conditions, cost reduction, and improved reproducibility. Furthermore, this synthetic method can be easily scaled up by increasing the amount of reactants and the volume of reactors, making it highly suitable for large-scale production of heterophase Pt-based nanomaterials. Additionally, the synthetic strategy serves as a general and robust method for preparing heterophase Pt and Pt-early transition metal alloys with controlled shapes. By utilizing 4H/fcc Au nanorods as seeds, heterophase Pt-based nanomaterials can be synthesized under mild conditions. Moreover, the morphologies of PtV and PtTi alloys grown on the Au nanorods can be adjusted by simply modifying the reaction conditions. The resulting 4H/fcc heterophase Pt-based nanomaterials can be utilized as novel heterogeneous catalysts for electrocatalytic alcohol oxidation reactions, demonstrating significant potential in various industrial fuel cell applications.

BRIEF DESCRIPTION OF DRAWINGS

Embodiments of the invention are described in more details hereinafter with reference to the drawings, in which.

DETAILED DESCRIPTION OF THE INVENTION

In the following description, Pt-based nanomaterials on nanorods and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In the present disclosure, a facile and two-step wet-chemical method is provided to achieve the controlled preparation of 4H/fcc heterophase Pt and Pt-early transition metal alloys nanomaterials. All the starting chemicals including solvents, precursors and surfactants are available from commercial sources. Briefly, the method used for the synthesis of 4H/fcc heterophase Pt-based nanomaterials comprises the usage of oleylamine, 1-octadecene, noble metal salts, ascorbic acid, and tetraoctylammonium bromide. Through simply tuning the reaction conditions, the morphologies of 4H/fcc PtV and PtTi alloys on the Au templates can be regulated, resulting in core-shell and hierarchical morphologies. The preparation of 4H/fcc heterophase Pt and Pt-early transition metal alloys through an epitaxial growth process is provided. By using 4H/fcc Au nanorods as seeds, 4H/fcc Au@Pt (i.e., gold (Au) serves as core and platinum (Pt) serve as shell), 4H/fcc Au@PtV (i.e., gold (Au) serves as core and platinum-vanadium (PtV) serve as shell) and 4H/fcc Au@PtTi (i.e., gold (Au) serves as core and platinum-titanium (PtTi) serve as shell) heterostructures can be constructed. Furthermore, the morphology of 4H/fcc Au@PtV and 4H/fcc Au@PtTi heterostructures can be tuned through precise modulation of the reaction conditions, resulting in the core-shell and hierarchical structures.

While not being limited by the mechanism of growth, the combination of platinum precursors with ligand-creating solvents such as oleylamine permits precise nanostructure control. Oleylamine is a positively charged strong coordinating solvent which can bind tightly with metal precursors to form a uniform solution. Oleylamine may also form complexes (e.g., ligand complexes) with the metal ions of the precursor. As a result, metastable materials may be formed that can act as secondary precursors and thus be decomposed in a controlled way to yield a selected structure.

Further, oleylamine may act as a cationic surfactant that ensures an even dispersion of the platinum. When the first mixture is added to the second mixture, negatively charged particles are first formed, and stabilized on either side by positively charged oleylamine ligands through electrostatic interactions. The oleylamine solvents may prevent the aggregation and thickness growth along the Z-direction resulting in the formation of desired island structures. Moreover, the oleylamine may stabilize the desired crystal structure.

Figure 1:
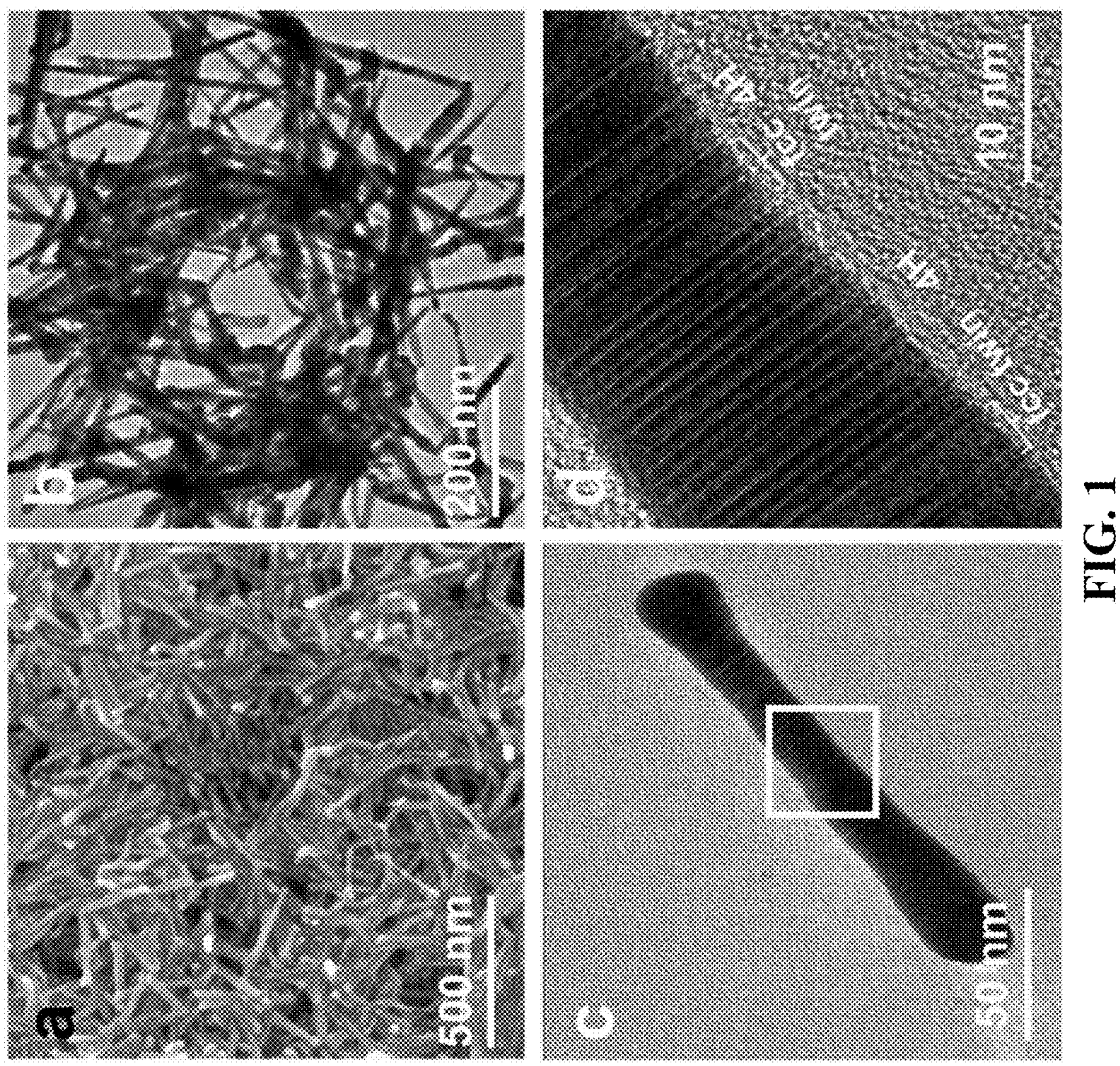
FIG. 1 shows characterization of 4H/fcc Au nanorods according to some embodiments of the present disclosure.

The 4H/fcc Au@Pt heterostructure, the 4H/fcc Au@PtV heterostructure, and the 4H/fcc Au@PtTi heterostructure can be synthesized by using 4H/fcc Au nanorods as seeds. FIG. 1 shows characterization of 4H/fcc Au nanorods according to some embodiments of the present disclosure, in which the section (a) of FIG. 1 is an exemplary scanning electron microscope (SEM) image of 4H/fcc Au nanorods; the section (b) of FIG. 1 is an exemplary low-resolution transmission electron microscopy (TEM) image of 4H/fcc Au nanorods; the section (c) of FIG. 1 is an exemplary TEM image of a typical Au nanorod; and the section (d) of FIG. 1 is an exemplary high-resolution TEM image of the region marked by the white square in the section (c), showing rich 4H and fcc-twin structures.

The synthesis process of 4H/fcc Au nanorods is provided herein.

In some embodiments involving a synthesis process for 4H/fcc Au nanorods, 3.2 ml 2-methylcyclohexylamine are first mixed with 6.8 ml oleylamine (OAm) in a 40-ml glass bottle to form a homogeneous solution, denoted as solution A. Then, 30.0 mg $HAuCl_4$ are added into the glass bottle containing the solution A, followed by purging oxygen gas into the solution to remove the air. After the glass bottle is sealed with polytetrafluoroethylene (PTFE) tape and parafilm, the mixture is vortexed until the HAuCl4 are completely dissolved. The resultant homogenous solution is then heated in an oil bath at 70° C. for 8 hours. After the reaction completed, the reddish-brown product is washed three times with a mixture of hexane and ethanol and re-dispersed into 3.0 ml hexane, resulting in 4H/fcc Au nanorods dispersed in hexane.

The synthesis process of 4H/fcc Au@Pt heterostructure is provided herein.

In some embodiments involving a synthesis process for 4H/fcc Au@Pt heterostructure, 2.0 mg $Pt(acac)_2$ and 20.0 mg L-ascorbic acid are added into a 15 ml Schlenk tube containing 2.0 ml OAm. Subsequently, the mixture is sonicated for 30 minutes. After that, 0.75 ml of the as-prepared 4H/fcc Au nanorods dispersed in hexane are added into the solution. The Schlenk tube is evacuated for 30 minutes at room temperature and purged with $N_2$ under magnetic stirring. Then the mixture is then heated to 170° C. and kept for 5 hours. Finally, the as-obtained product is washed 3 times with the mixture of hexane and ethanol by centrifugation at 5000 r.p.m. for 3 minutes. The obtained 4H/fcc core-shell Au@Pt nanorods are re-dispersed into hexane for further characterization.

In one embodiment, the 4H/fcc Au@Pt heterostructure can be synthesized with the 4H/fcc Au nanorods as seeds by using platinum (II) acetylacetonate as the metal precursor, oleylamine as the solvent and surfactant, and L-ascorbic acid as the reducing agent.

Figure 2:
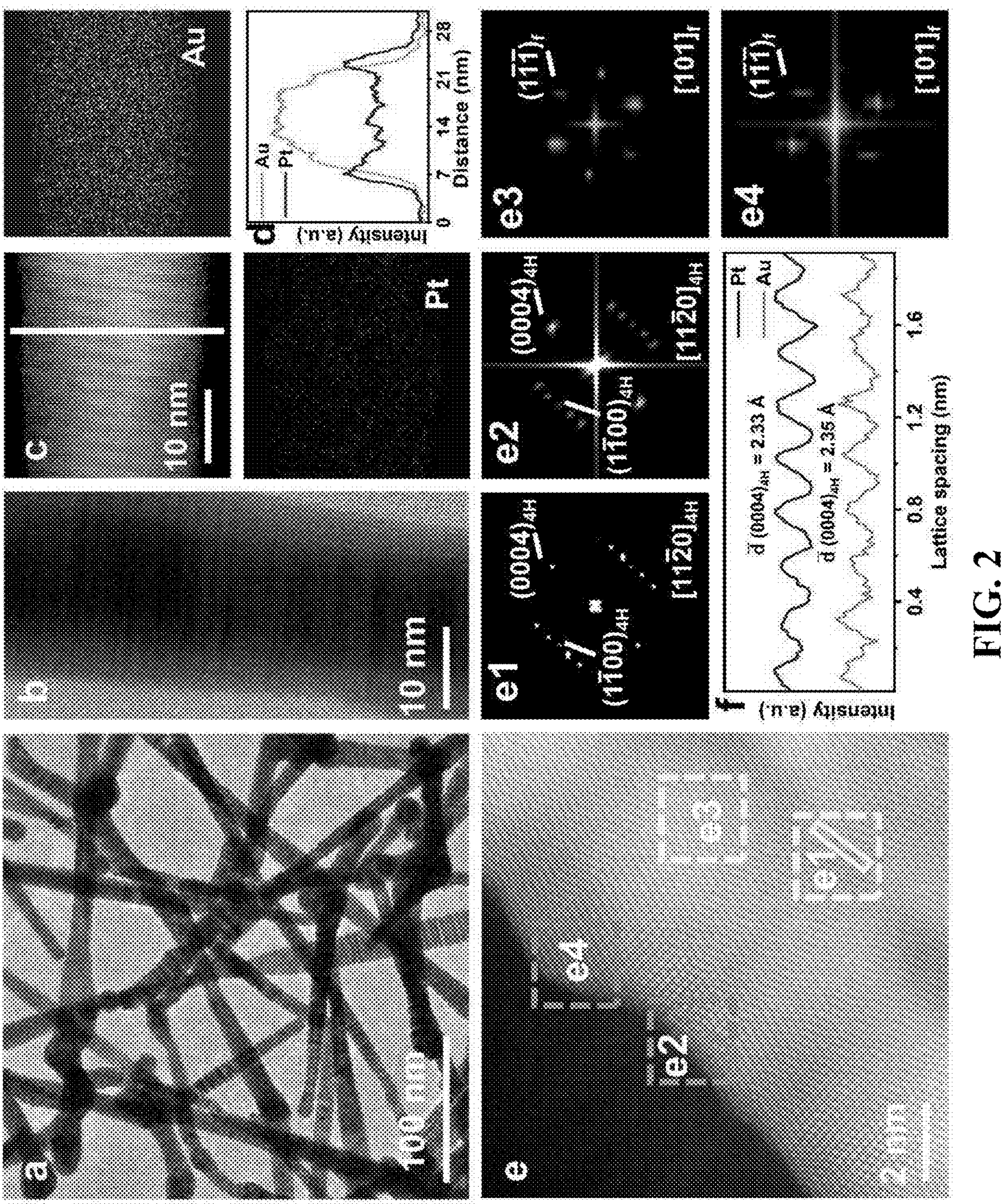
FIG. 2 shows characterization of 4H/fcc Au@Pt heterostructure according to some embodiments of the present disclosure.
Figure 3:
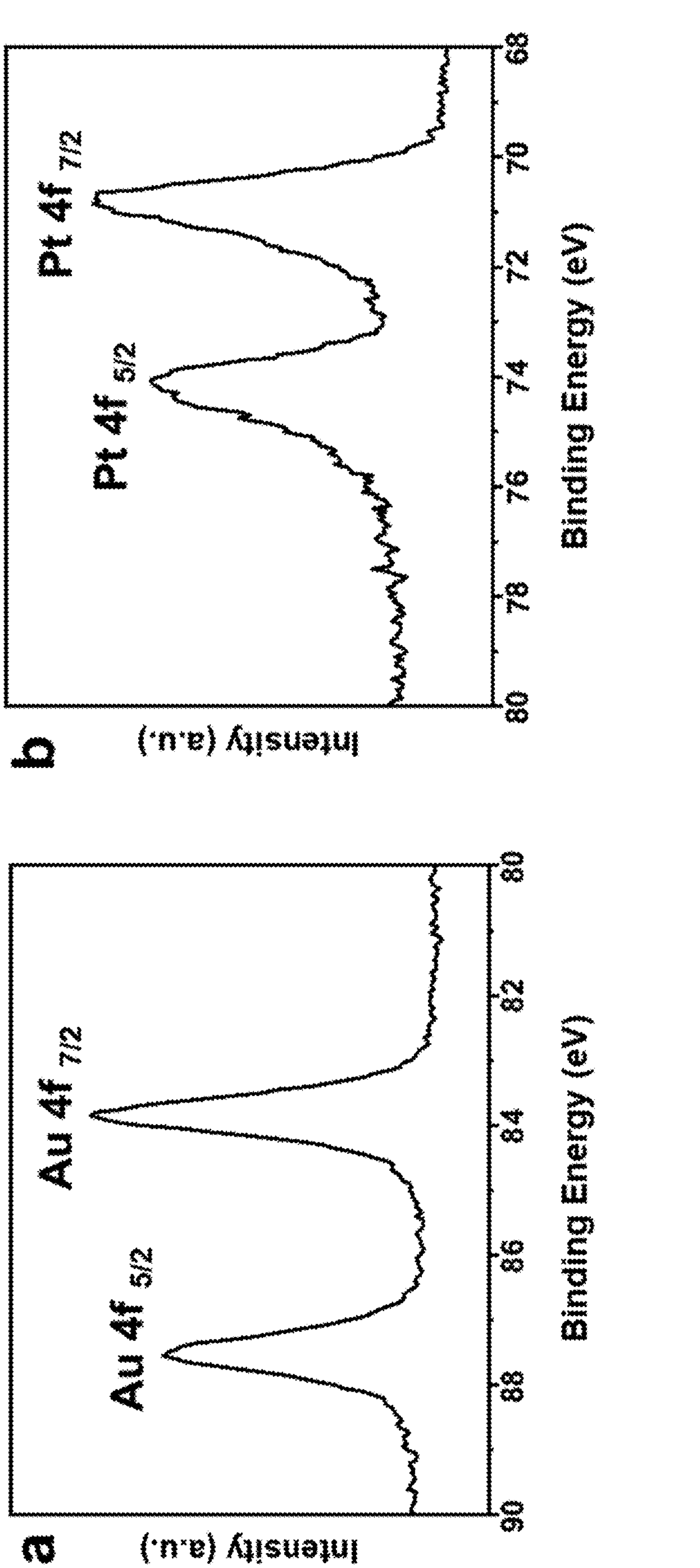
FIG. 3 is an exemplary X-ray photoelectron spectroscopy (XPS) pattern of 4H/fcc Au@Pt heterostructure.

With respect to the characterization, FIG. 2 shows characterization of 4H/fcc Au@Pt heterostructure according to some embodiments of the present disclosure, in which the section (a) of FIG. 2 is an exemplary TEM image of 4H/fcc Au@Pt nanorods; the section (b) of FIG. 2 is an exemplary TEM image of a typical 4H/fcc Au@Pt nanorod; the section (c) of FIG. 2 is an exemplary scanning transmission electron microscopy (STEM) image and the corresponding energy-dispersive X-ray spectroscopy (EDS) elemental mappings of a 4H/fcc Au@Pt nanorod; the section (d) of FIG. 2 is an exemplary EDS line-scan profile across an individual 4H/fcc Au@Pt nanorod marked by the white line in section (c); the section (e) of FIG. 2 is an exemplary aberration-corrected high-resolution HAADF-STEM image of a representative 4H/fcc Au@Pt nanorod; the section (e1)-(e4) of FIG. 2 are exemplary FFT images taken from the corresponding dashed squares in the section (e); and the section (f) of FIG. 2 are exemplary integrated pixel intensities of Au (taken from the yellow rectangle in area of the section (e1)) and Pt (taken from the blue rectangle in area of the section (e2)) along the $[0004]_{4H}$ direction. FIG. 3 is an exemplary X-ray photoelectron spectroscopy (XPS) pattern of 4H/fcc Au@Pt heterostructure, showing the core level peaks of Au 4f at section (a) and Pt 4f at section (b).

Specifically, the TEM images in the sections (a) and (b) of FIG. 2 show the morphology of the as-prepared 4H/fcc Au@Pt nanorods, where the uniform coating of Pt shell with an average thickness of 4.7±0.5 nm on the Au nanorod can be observed. The STEM-EDS elemental mappings (the section (c) of FIG. 2) and line scan (the section (d) of FIG. 2) show the atomic distributions of Au and Pt, confirming the formation of core-shell heterostructure. The aberration-corrected HAADF-STEM is used to investigate the atomic structure of 4H/fcc Au@Pt heterostructure. As shown in the section (e) of FIG. 2, the continuous lattice fringes extending from the Au core to the Pt shell indicate the epitaxial growth relationship. The fast Fourier transform (FFT) patterns in the sections (e1), (e2), (e3), (e4) of FIG. 2 demonstrate both Au and Pt possess 4H/fcc heterophase. In addition, the integrated pixel intensities for the $(0004)_{4H}$ lattices are shown in the section (f) of FIG. 2, where the average lattice spacing of $(0004)_{4H}$ changes from 2.35 Å in region e1 of the Au nanorod to 2.33 Å in region e2 of the Pt shell. The atomic ratio of Au:Pt is measured to be 69.4:30.6 by inductively coupled plasma-optical emission spectroscopy (ICP-OES). Moreover, XPS is conducted to study the electronic structures of Au and Pt, as shown in FIG. 3. The peaks in the Au 4f and Pt 4f XPS spectrum can affirm the metallic states of Au and Pt elements in the 4H/fcc Au@Pt heterostructure.

The synthesis processes of core-shell Au@PtV and Au@PtTi heterostructures are provided herein.

In some embodiments involving a synthesis process for a core-shell Au@PtV heterostructure, 2.0 ml ODE are first mixed with 2.0 ml OAm in a 15 ml Schlenk tube. Then 2.0 mg $Pt(acac)_2$, 4.0 mg $V(acac)_3$, and 20.0 mg L-ascorbic acid are added into the solution. Subsequently, the mixture is sonicated for 30 minutes. After that, 2.0 mg TOAB and 0.75 ml of the as-prepared 4H/fcc Au nanorods dispersed in hexane are added into the solution. The Schlenk tube is evacuated for 30 minutes at room temperature and purged with $N_2$ under magnetic stirring. The mixture is then heated to 180° C. and kept for 5 hours. Finally, the as-obtained product is washed 3 times with the mixture of hexane and ethanol by centrifugation at 5000 r.p.m. for 3 minutes. The obtained 4H/fcc core-shell Au@PtV heterostructure is re-dispersed into hexane for further characterization. In some embodiments involving a synthesis process for a core-shell Au@PtTi heterostructure, the synthesis condition of 4H/fcc core-shell Au@PtTi is similar to that of Au@PtV nanostructure, except the $V(acac)_3$ is replaced by the titanium oxide acetylacetonate and the reaction temperature is increased to 185° C.

The synthesis processes of hierarchical Au@PtV and Au@PtTi heterostructures are provided herein.

In some embodiments involving a synthesis process for a hierarchical Au@PtV heterostructure, 2.0 mg $Pt(acac)_2$ and 3.0 mg $V(acac)_3$ are added into a 15 ml Schlenk tube containing 2.0 ml OAm. Subsequently, the mixture is sonicated for 30 minutes. Then 5.0 mg TOAB and 0.75 ml of the as-prepared 4H/fcc Au nanorods dispersed in hexane are added into the solution. The Schlenk tube is evacuated for 30 minutes at room temperature to remove the hexane under magnetic stirring. The mixture is heated to 190° C. and kept for 12 hours. Finally, the as-obtained product is washed 3 times with the mixture of hexane and ethanol by centrifugation at 5000 r.p.m. for 3 minutes. The obtained samples are re-dispersed into hexane for further characterization. In some embodiments involving a synthesis process for a hierarchica Au@PtTi heterostructure, the synthesis condition of 4H/fcc hierarchical Au@PtTi is similar to that of Au@PtV nanostructure, except the $V(acac)_3$ is replaced by the titanium oxide acetylacetonate and the reaction temperature is increased to 195° C.

In one embodiment, the 4H/fcc core-shell Au@Pt heterostructure can be synthesized with the 4H/fcc Au nanorods as seeds by using platinum (II) acetylacetonate and vanadium (III) acetylacetonate as metal precursors, a mixture of oleylamine and 1-octadecene as the solvent, tetraoctylammonium bromide as the surfactant, and L-ascorbic acid as the reducing agent.

Figure 4:
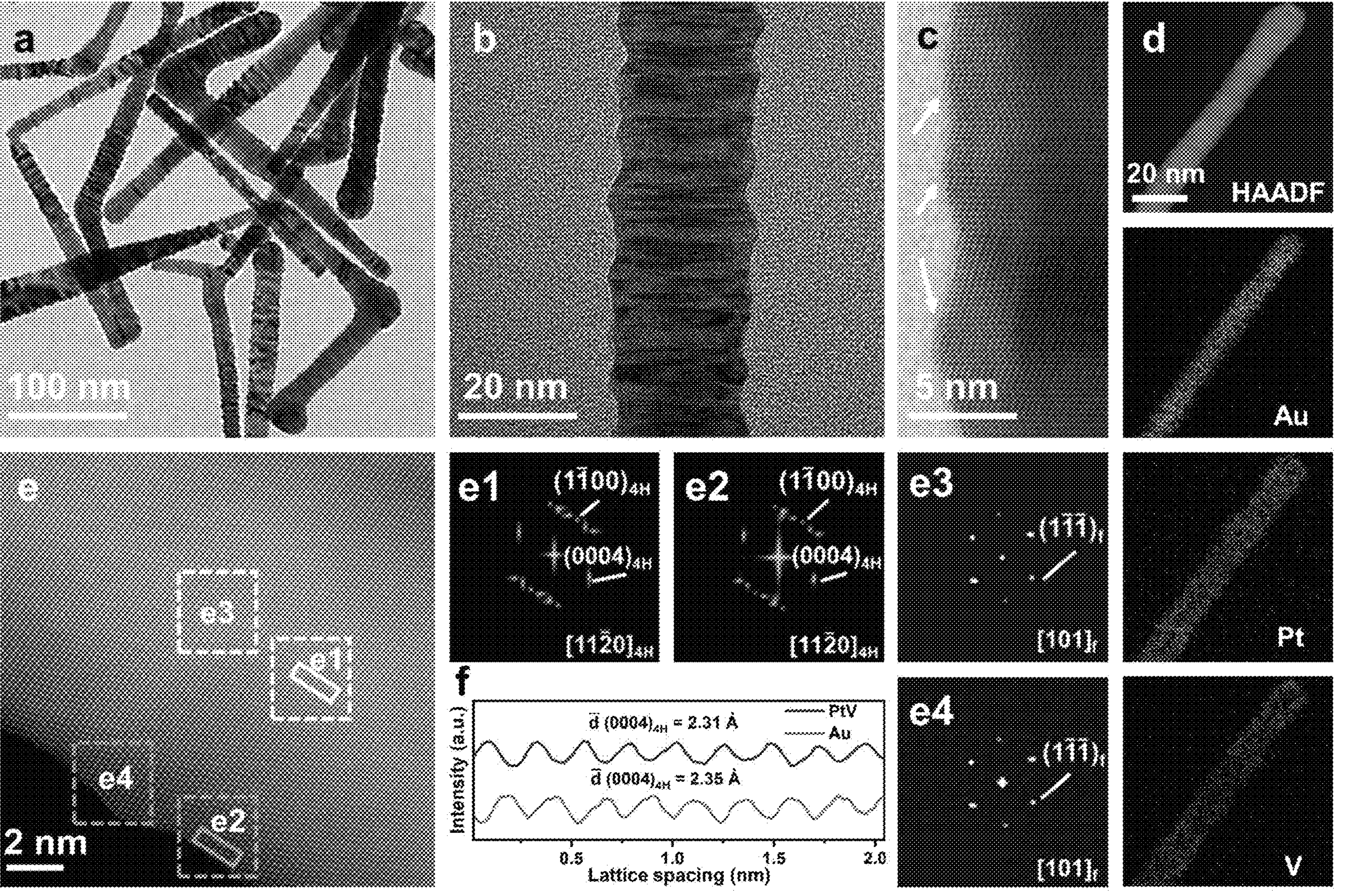
FIG. 4 shows characterization of 4H/fcc core-shell Au@PtV heterostructure according to some embodiments of the present disclosure.

With respect to the characterization, FIG. 4 shows characterization of 4H/fcc core-shell Au@PtV heterostructure according to some embodiments of the present disclosure, in which the section (a) of FIG. 4 is an exemplary TEM image of 4H/fcc core-shell Au@PtV nanorods; the section (b) of FIG. 4 is an exemplary TEM image of a typical 4H/fcc core-shell Au@PtV nanorod; the section (c) of FIG. 4 is an exemplary high-resolution TEM image of the 4H/fcc core-shell Au@PtV nanorod and the white arrows show the abundant atomic steps on the surface; the section (d) of FIG. 4 is an exemplary STEM image and the corresponding EDS elemental mappings of a 4H/fcc core-shell Au@PtV nanorod; the section (e) of FIG. 4 is an exemplary. aberration-corrected high-resolution HAADF-STEM image of a representative 4H/fcc core-shell Au@PtV nanorod; the section (e1)-(e4) of FIG. 4 are exemplary FFT images taken from the corresponding dashed squares in the section (e); and the section (f) of FIG. 4 are exemplary integrated pixel intensities of Au (taken from the yellow rectangle in area of the section (e1)) and PtV (taken from the blue rectangle in area of the section (e2)) along the $[0004]_{4H}$ directions.

Figure 5:
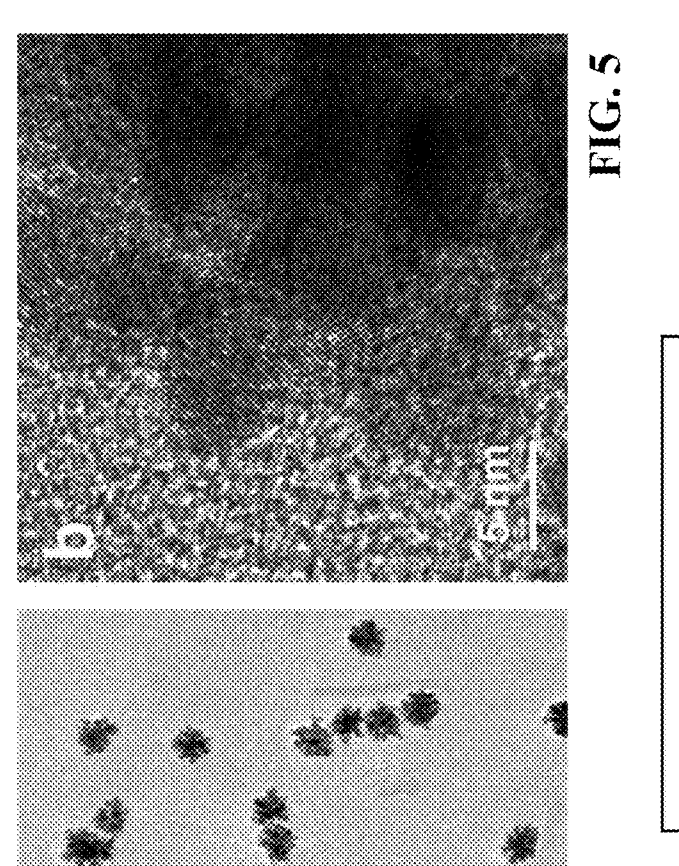
FIG. 5 shows characterization of the products according to some embodiments of the present disclosure.
Figure 6:
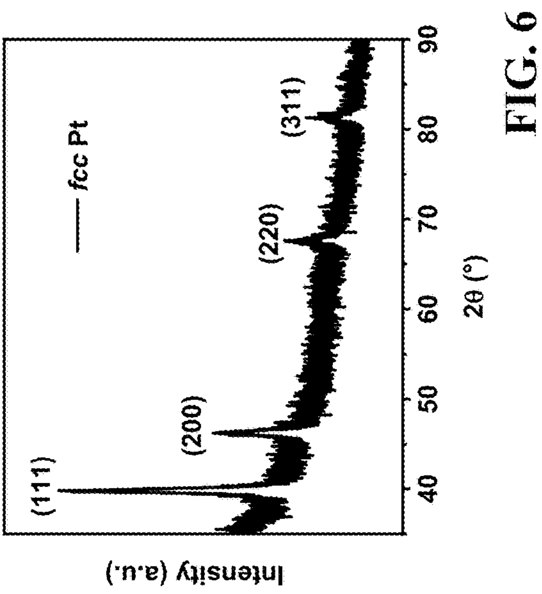
FIG. 6 shows an exemplary XRD pattern of the products according to some embodiments of the present disclosure.
Figures 7, 8:
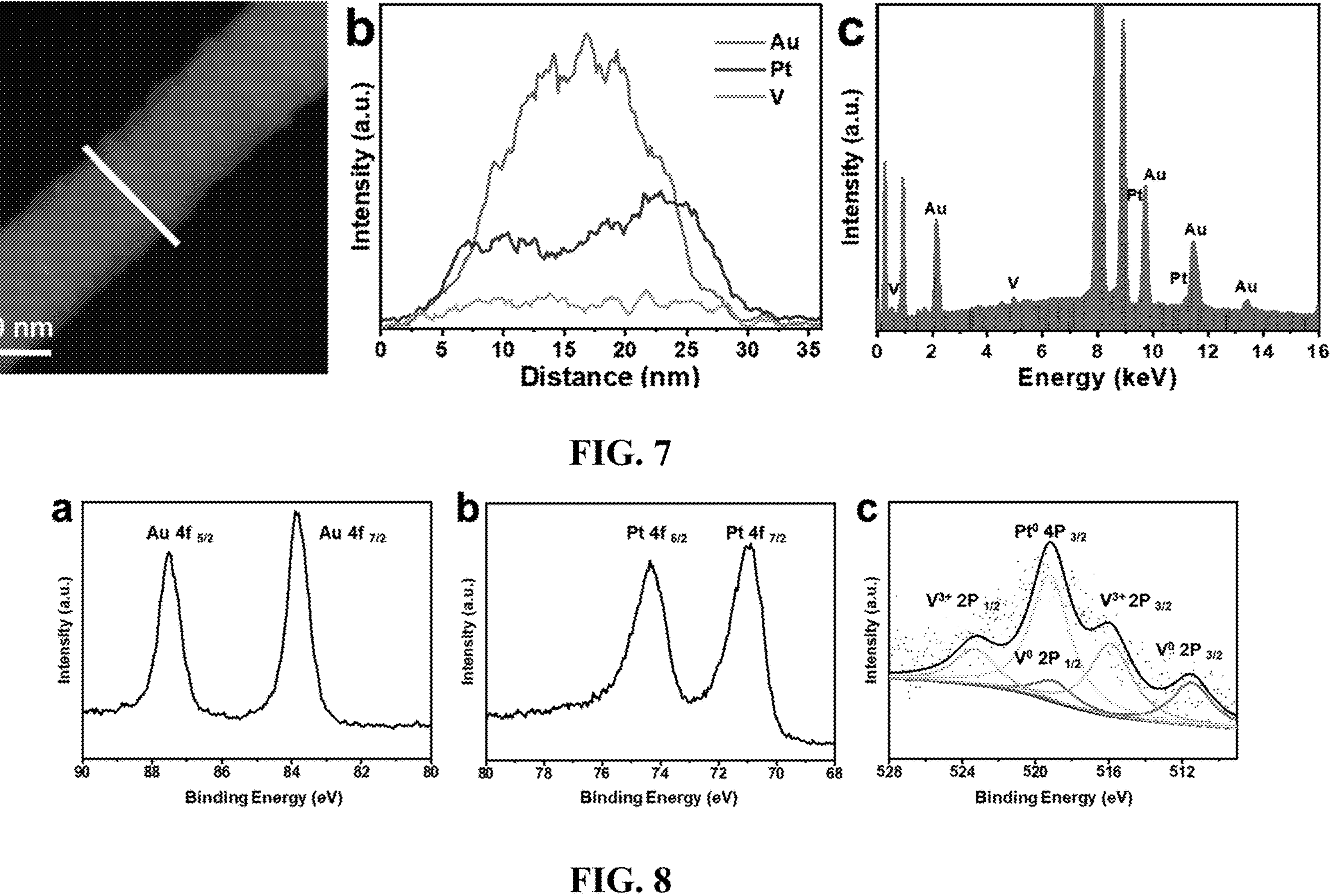
FIG. 7 shows further characterization of the products according to some embodiments of the present disclosure.
FIG. 8 shows an exemplary XPS pattern of 4H/fcc core-shell Au@PtV heterostructure according to some embodiments of the present disclosure.

FIG. 5 shows characterization of the products obtained under the similar reaction condition to that of 4H/fcc core-shell Au@PtV heterostructure except that the Au nanorods are not added according to some embodiments of the present disclosure, in which the section (a) of FIG. 5 is an exemplary TEM image; and section (b) of FIG. 5 is an exemplary high-resolution TEM image, showing the fcc Pt dendrite and there is no V in the products based on the ICP-OES. FIG. 6 shows an exemplary XRD pattern of the products obtained under the similar reaction condition to that of 4H/fcc core-shell Au@PtV heterostructure except that the Au nanorods are not added, in which the peaks are well-indexed to the fcc Pt (JCPDS: 70-2075). FIG. 7 shows further characterization of the products according to some embodiments of the present disclosure, in which the section (a) of FIG. 7 is an exemplary HAADF-STEM image of a typical 4H/fcc core-shell Au@PtV nanorod; the section (b) of FIG. 7 is an exemplary. line scan of a 4H/fcc core-shell Au@PtV nanorod by the while line in the section (a); and the section (c) of FIG. 7 is an exemplary representative STEM-EDS spectrum of 4H/fcc core-shell Au@PtV heterostructure. FIG. 8 shows an exemplary XPS pattern of 4H/fcc core-shell Au@PtV heterostructure, showing the core level peaks of Au 4f at the section (a), Pt 4f at the section (b), and V 2p at the section (c).

The TEM images in the sections (a) and (b) of FIG. 4 show the morphology of 4H/fcc core-shell Au@PtV nanorods, where the Au nanorod is coated by the PtV shell with an average thickness of 4.2±0.9 nm. Note that fcc Pt dendritic nanoparticles, instead of PtV alloys, are formed under the same condition except the absence of Au seeds, as shown in FIG. 5 and FIG. 6. There are abundant atomic steps and kinks on the surface of 4H/fcc PtV shell, as shown in the section (c) of FIG. 4. The STEM-EDS elemental mappings (see the section (d) of FIG. 4) show the atomic distributions of Au, Pt, and V, affirming the formation of core-shell heterostructure. The aberration-corrected HAADF-STEM image in the section (e) of FIG. 4 exhibits the atomic structure of 4H/fcc core-shell Au@PtV heterostructure. The continuous lattice fringes illustrate the epitaxial growth relationship, and the corresponding FFT patterns in the section (e1)-(e4) of FIG. 4 affirm the 4H/fcc heterophase in the core-shell Au@PtV heterostructure. The integrated pixel intensities for the $(0004)_{4H}$ lattices are also calculated and shown in section (f) of FIG. 4, where the average lattice spacing of $(0004)_{4H}$ changes from 2.35 Å in region e1 of the Au nanorod to 2.31 Å in region e2 of the PtV alloy. The incorporation of V leads to the lattice compression of 4H Pt nanostructure, which is consistent with previous studies on Pt-based nanomaterials. The EDS line scanning profile (see FIG. 7) further shows the elemental distributions of 4H/fcc core-shell Au@PtV heterostructure. The atomic ratio of Au:Pt:V is measured to be 66.1:25.9:8.0 by ICP-OES, indicating a Pt:V ratio of ~3.2. Moreover, the metallic states of Au and Pt are confirmed by XPS (see FIG. 8), and the coexistence of metallic and oxidation states ($V^{3+}$) of V element is revealed, which could be attributed to the surface oxidation of V when exposed in air.

In one embodiment, to synthesize 4H/fcc hierarchical Au@PtV heterostructure, oleylamine is used as the solvent and reducing agent, and a large amount of tetraoctylammonium bromide is used as the surfactant.

Figure 9:
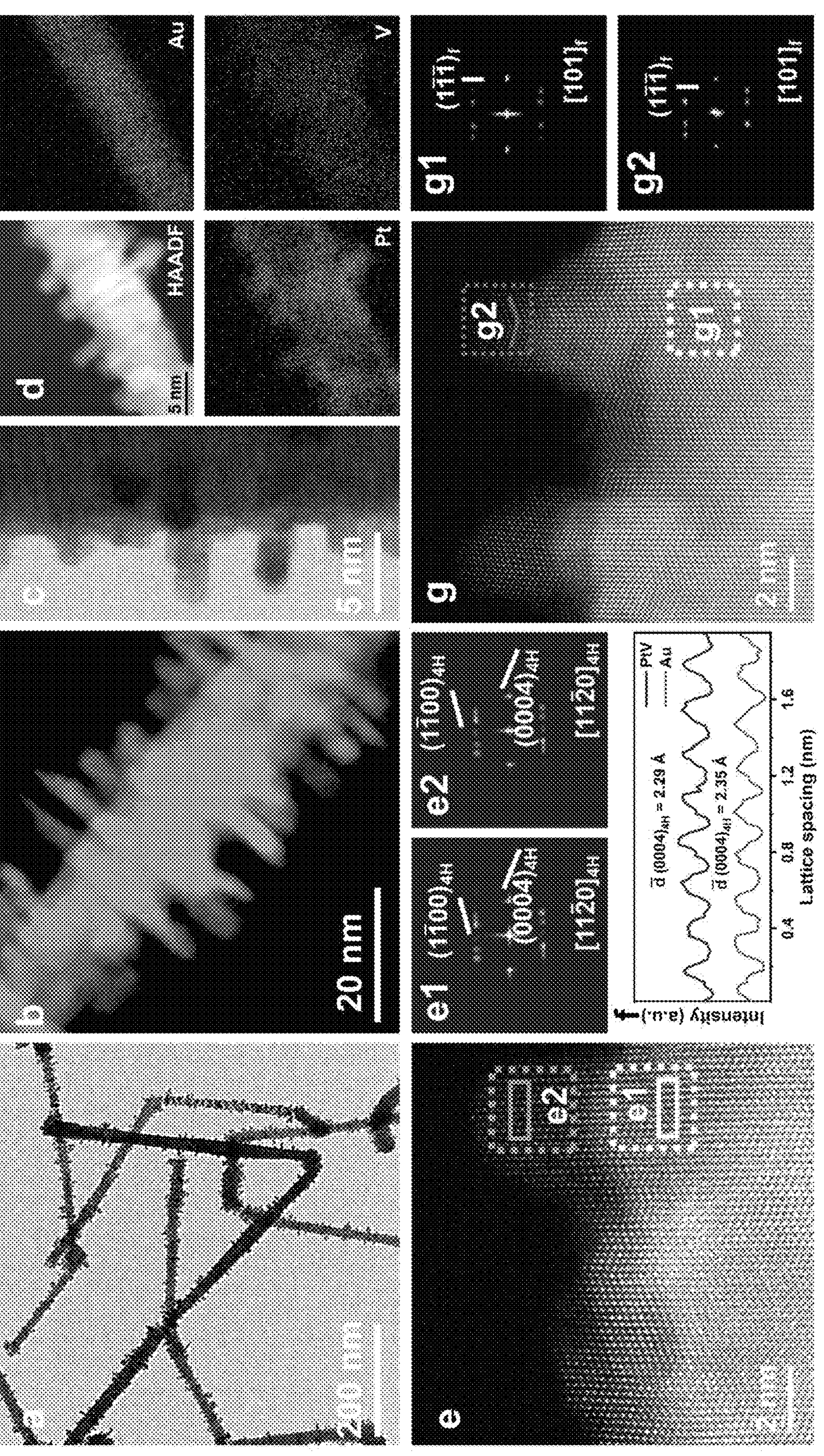
FIG. 9 shows characterization of 4H/fcc hierarchical Au@PtV heterostructure according to some embodiments of the present disclosure.

With respect to the characterization, FIG. 9 shows characterization of 4H/fcc hierarchical Au@PtV heterostructure according to some embodiments of the present disclosure, in which the section (a) of FIG. 9 is an exemplary TEM image of 4H/fcc hierarchical Au@PtV nanorods; the section (b) of FIG. 9 is an exemplary. STEM image of a typical 4H/fcc hierarchical Au@PtV nanorod; the section (c) of FIG. 9 is an exemplary high-resolution TEM image of a 4H/fcc hierarchical Au@PtV nanorod; the section (d) of FIG. 9 is an exemplary STEM image and the corresponding EDS elemental mappings; the section (e) of FIG. 9 is an exemplary aberration-corrected high-resolution HAADF-STEM image of a representative 4H/fcc hierarchical Au@PtV nanorod; the sections (e1) and (e2) of FIG. 9 are exemplary FFT images taken from the corresponding dashed squares in the section (e); and the section (f) of FIG. 9 is an exemplary integrated pixel intensities of Au (taken from the yellow rectangle in area of the section (e1)) and PtV (taken from the blue rectangle in area of the section (e2)) along the $[0004]_{4H}$ directions; the section (g) of FIG. 9 is an exemplary aberration-corrected high-resolution HAADF-STEM image of a representative 4H/fcc hierarchical Au@PtV nanorod, showing the fcc-twin structure in the tiny PtV nanorod and the polyline marks the fcc-twin boundary in the PtV nanorod; and the sections (g1) and (g2) of FIG. 9 are exemplary images taken from the corresponding dashed squares in the section (g).

Figures 10, 11:
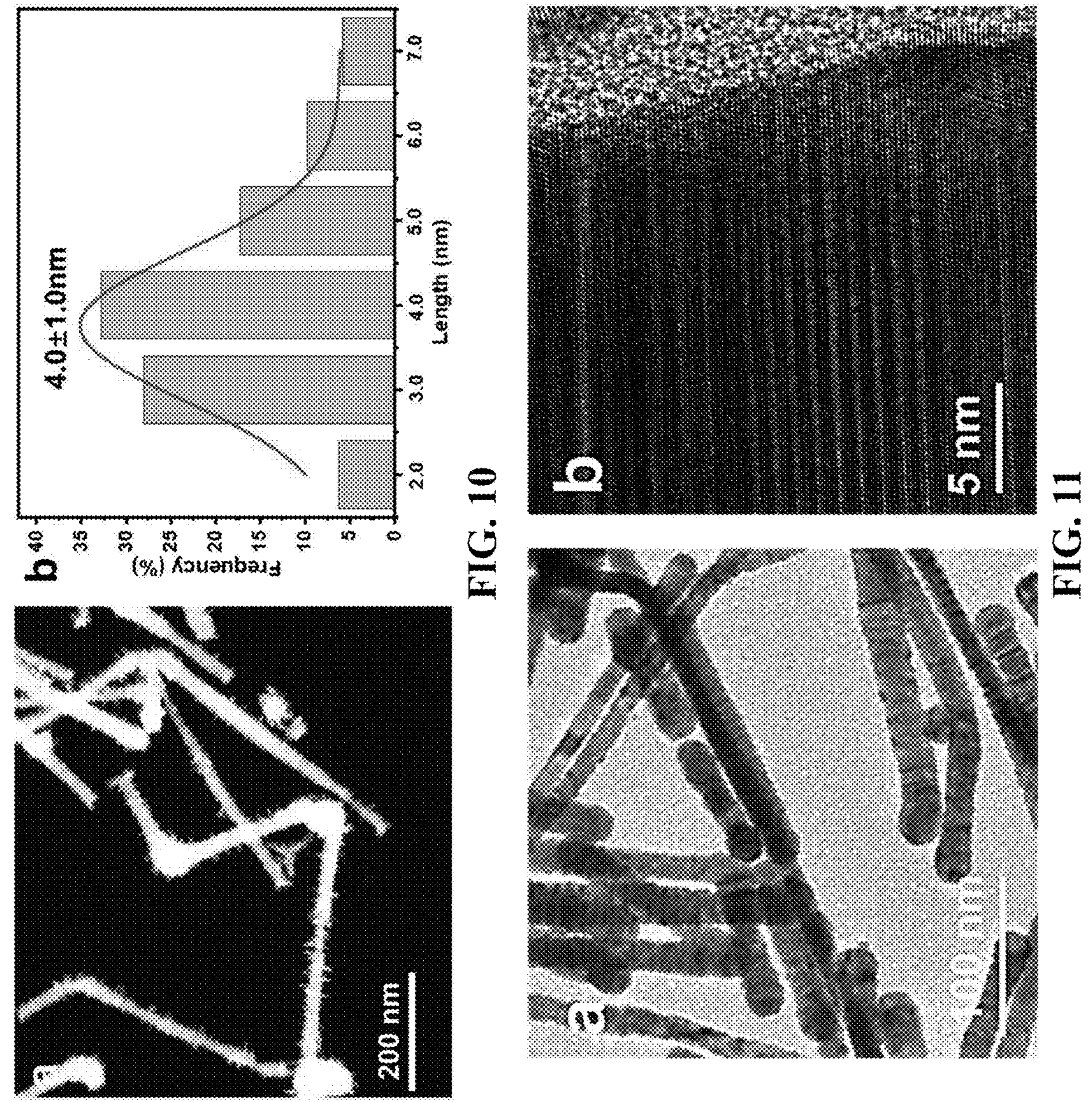
FIG. 10 shows further characterization of the products according to some embodiments of the present disclosure.
FIG. 11 shows further characterization of the products according to some embodiments of the present disclosure.
Figures 12, 13:
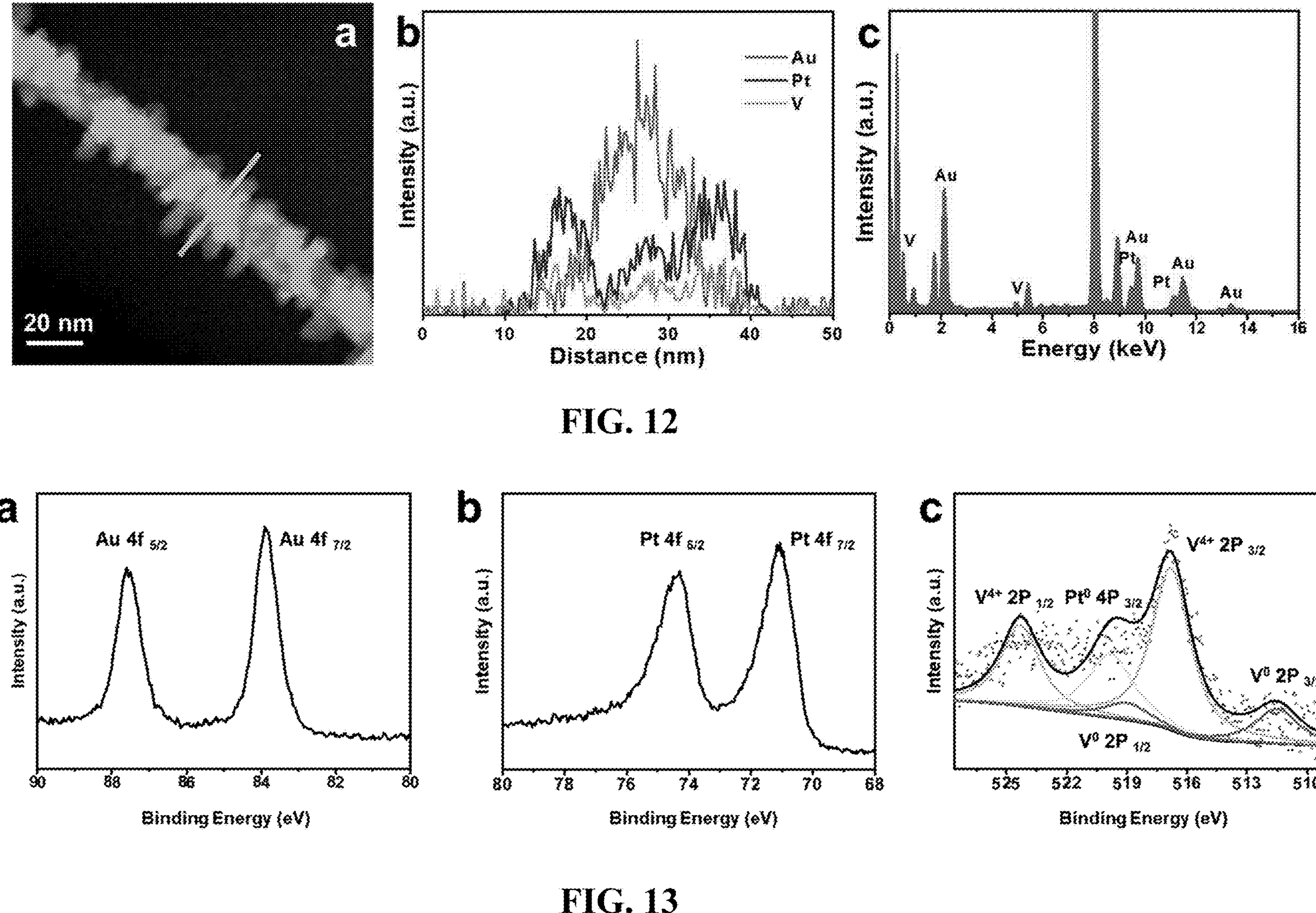
FIG. 12 shows further characterization of the products according to some embodiments of the present disclosure.
FIG. 13 shows an exemplary XPS pattern of the 4H/fcc hierarchical Au@PtV heterostructure.
Figure 14:
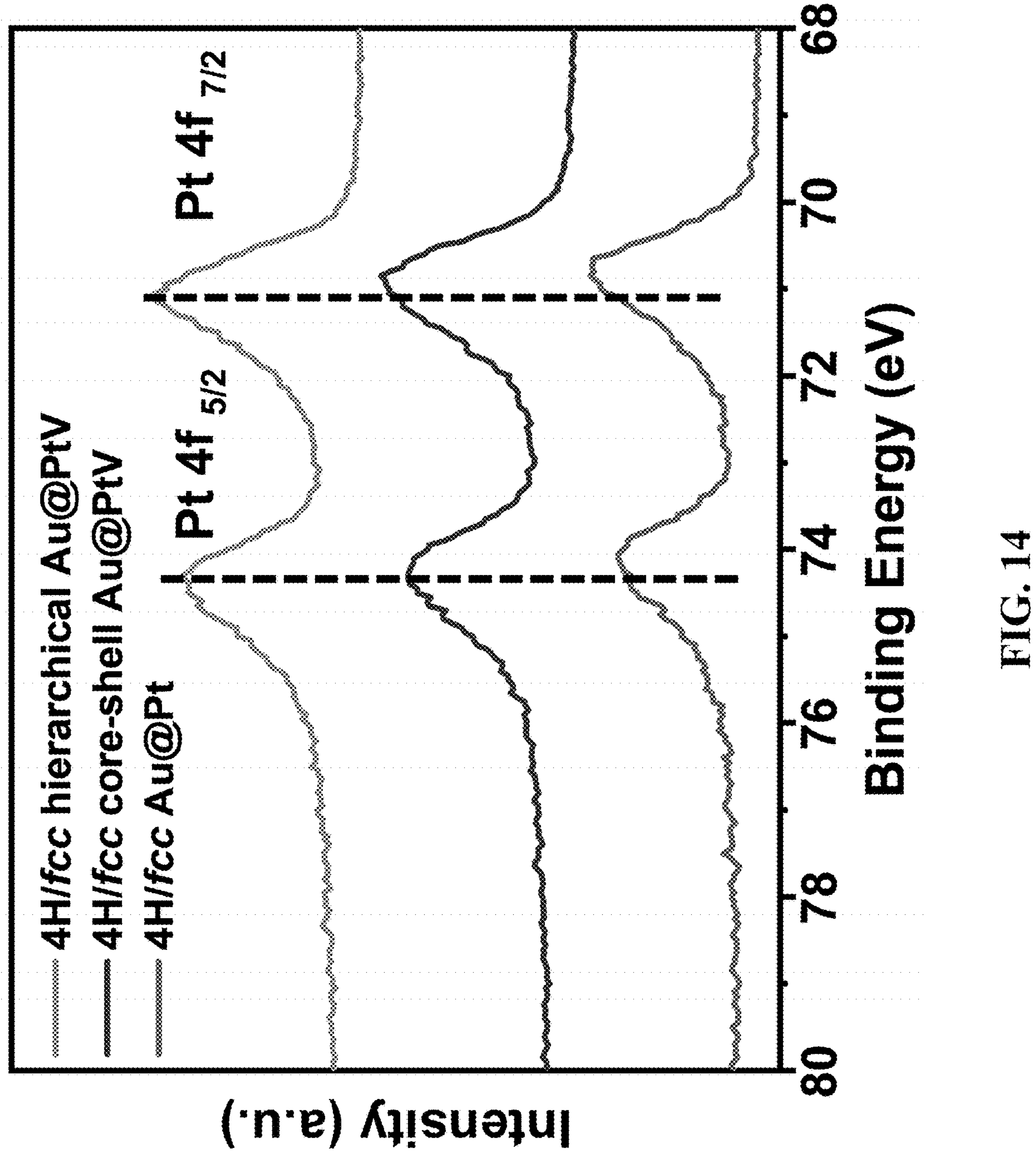
FIG. 14 shows an exemplary comparison of core level peaks of Pt 4f of 4H/fcc Au@Pt and 4H/fcc Au@PtV heterostructures in the XPS pattern according to some embodiments of the present disclosure.

FIG. 10 shows further characterization of the products according to some embodiments of the present disclosure, in which the section (a) of FIG. 10 is an exemplary STEM image of 4H/fcc hierarchical Au@PtV nanorods; and the section (b) of FIG. 10 is an exemplary statistical analysis of the length of PtV nanorods in the 4H/fcc hierarchical Au@PtV heterostructure. FIG. 11 shows further characterization of the products obtained under the similar reaction condition to that of the 4H/fcc hierarchical Au@PtV heterostructure except that the V precursor is not added, in which the section (a) of FIG. 11 is an exemplary TEM image; and the section (b) of FIG. 11 is an exemplary high-resolution TEM image, showing the smooth surface of the product. FIG. 12 shows further characterization of the products according to some embodiments of the present disclosure, in which the section (a) of FIG. 12 is an exemplary HAADF-STEM image of a representative 4H/fcc hierarchical Au@PtV nanorod; the section (b) of FIG. 12 is the exemplary corresponding STEM-EDS line scanning profile along the white line in the section (a); and the section (c) of FIG. 12 is an exemplary representative STEM-EDS spectrum of the 4H/fcc hierarchical Au@PtV heterostructure. FIG. 13 shows an exemplary XPS pattern of the 4H/fcc hierarchical Au@PtV heterostructure, showing the core level peaks of Au 4f at the section (a), Pt 4f at the section (b), and V 2p at the section (c). FIG. 14 shows an exemplary comparison of core level peaks of Pt 4f of 4H/fcc Au@Pt and 4H/fcc Au@PtV heterostructures in the XPS pattern.

The TEM image in the section (a) of FIG. 9 and the STEM image in the section (b) of FIG. 9 illustrate the hierarchical morphology of 4H/fcc Au@PtV heterostructure. Tiny PtV nanorods grow vertically on the 4H/fcc Au nanorods (see the section (c) of FIG. 9), and the average length is measured to be 4.0±1.0 nm (see FIG. 10). Notably, the atomic ratio of Au:Pt:V is similar to that of the 4H/fcc core-shell Au@PtV heterostructure, which is measured to be 62.5:27.9:9.6 by ICP-OES. This provides opportunities to study the shape-dependent property of 4H/fcc Au@PtV heterostructures. The atomic distributions of Au, Pt, and V in the 4H/fcc hierarchical Au@PtV heterostructure are shown in the section (d) of FIG. 9. The section (e) of FIG. 9 and the corresponding FFT patterns in the sections (e1) and (e2) of FIG. 9 reveal the continuous lattice fringes from the 4H phase of Au seed to the overgrown PtV alloys, affirming the epitaxial growth relationship. Compared with 4H/fcc core-shell Au@PtV heterostructure, the average lattice spacing of $(0004)_{4H}$ changes from 2.35 Å in region e1 of the Au nanorod to 2.29 Å in region e2 of the PtV alloy (see the section (f) of FIG. 9), suggesting a lattice compression of PtV $(0004)_{4H}$. Moreover, the PtV nanorod with fcc-twin structure can also grow on the 4H/fcc Au nanorod, as shown in the section (g) of FIG. 9 and the corresponding FFT patterns in the sections (g1) and (g2) of FIG. 9. Basically, the 4H phase and fcc-twin boundaries could possess different surface energies compared with the defect-free fcc phase, thus they can serve as the preferred growth sites for tiny PtV nanorods to form the hierarchical heterostructure if the reaction conditions could be finely modulated. In addition, vanadium (III) acetylacetonate is proven necessary for the formation of such type of hierarchical heterostructure (see FIG. 11). The EDS line scan (see FIG. 12) also reveal the elemental distributions of Au, Pt, and V in the 4H/fcc hierarchical Au@PtV heterostructure. Besides, the Au 4f and Pt 4f XPS spectrums confirm the metallic state of Au and Pt elements. In the V 2P spectrum, the co-existence of metallic and oxidation states ($V^{4+}$) is revealed, suggesting the surface oxidation of V in the obtained 4H/fcc hierarchical Au@PtV heterostructure (see FIG. 13). More importantly, the Pt 4f peaks of 4H/fcc Au@Pt, 4H/fcc core-shell Au@PtV, and 4H/fcc hierarchical Au@PtV are compared (see FIG. 14). The Pt 4f peaks of the 4H/fcc hierarchical Au@PtV shift to higher binding energies, indicating the modified electronic structures of Pt. Such positive shift of Pt 4f peaks could be attributed to the lattice compression of the 4H PtV, as revealed in the average lattice spacing change of $(0004)_{4H}$ from FIG. 2, FIG. 4, and FIG. 9.

Figure 15:
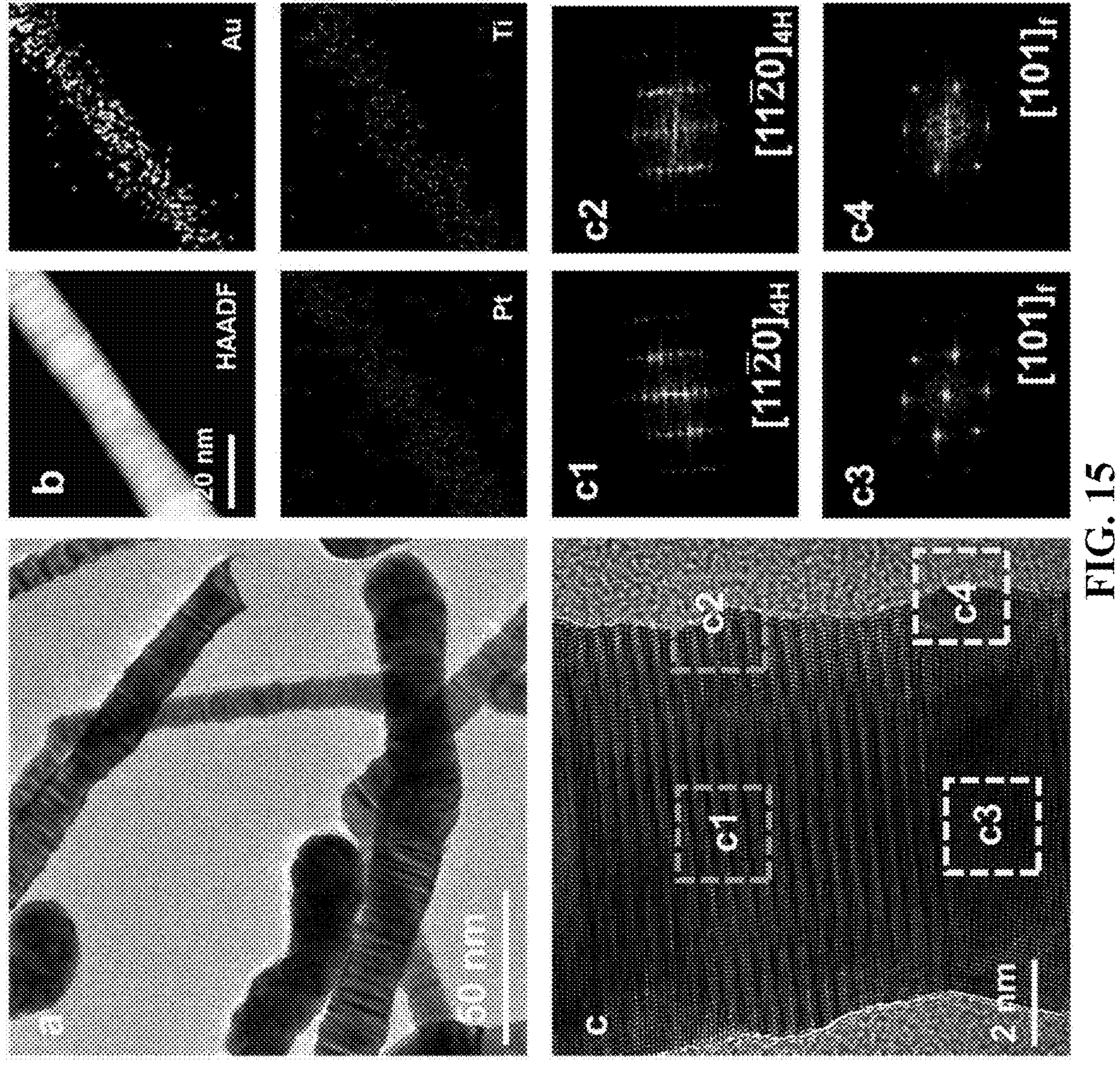
FIG. 15 shows characterization of 4H/fcc Au@PtTi heterostructure according to some embodiments of the present disclosure.

In one embodiment, the synthesis process also enables the formation of 4H/fcc PtTi alloys with controlled morphologies under mild conditions With respect to the characterization of 4H/fcc Au@PtTi heterostructure, FIG. 15 shows characterization of 4H/fcc Au@PtTi heterostructure according to some embodiments of the present disclosure, in which the section (a) of FIG. 9 is an exemplary TEM image of 4H/fcc core-shell Au@PtTi nanorods; the section (a) of FIG. 15 is an exemplary STEM image and the corresponding EDS elemental mappings of a 4H/fcc core-shell Au@PtTi nanorod; the section (c) of FIG. 15 is an exemplary high-resolution TEM image of the 4H/fcc core-shell Au@PtTi nanorod and the white arrows show the abundant atomic steps on the surface; and the sections (c1)-(c4) of FIG. 15 are exemplary FFT images taken from the corresponding dashed squares in the section (c).

Figure 16:
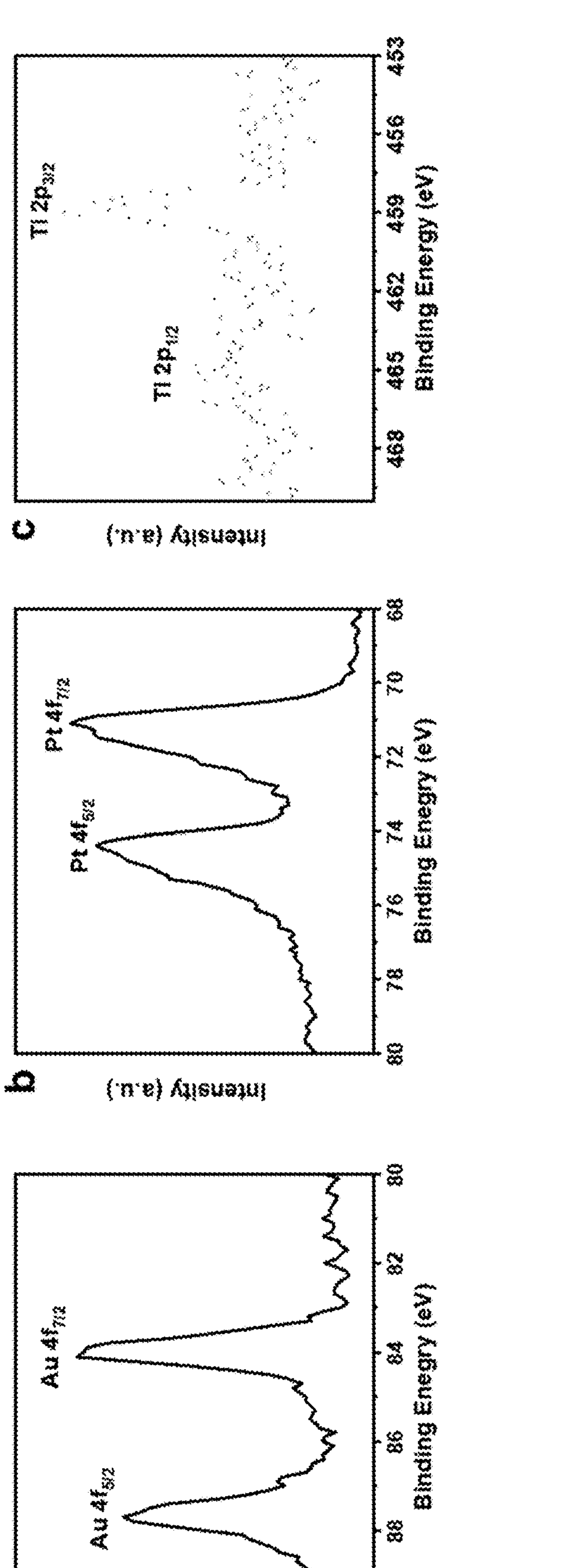
FIG. 16 shows an exemplary XPS pattern of the 4H/fcc core-shell Au@PtTi heterostructure according to some embodiments of the present disclosure.
Figure 17:
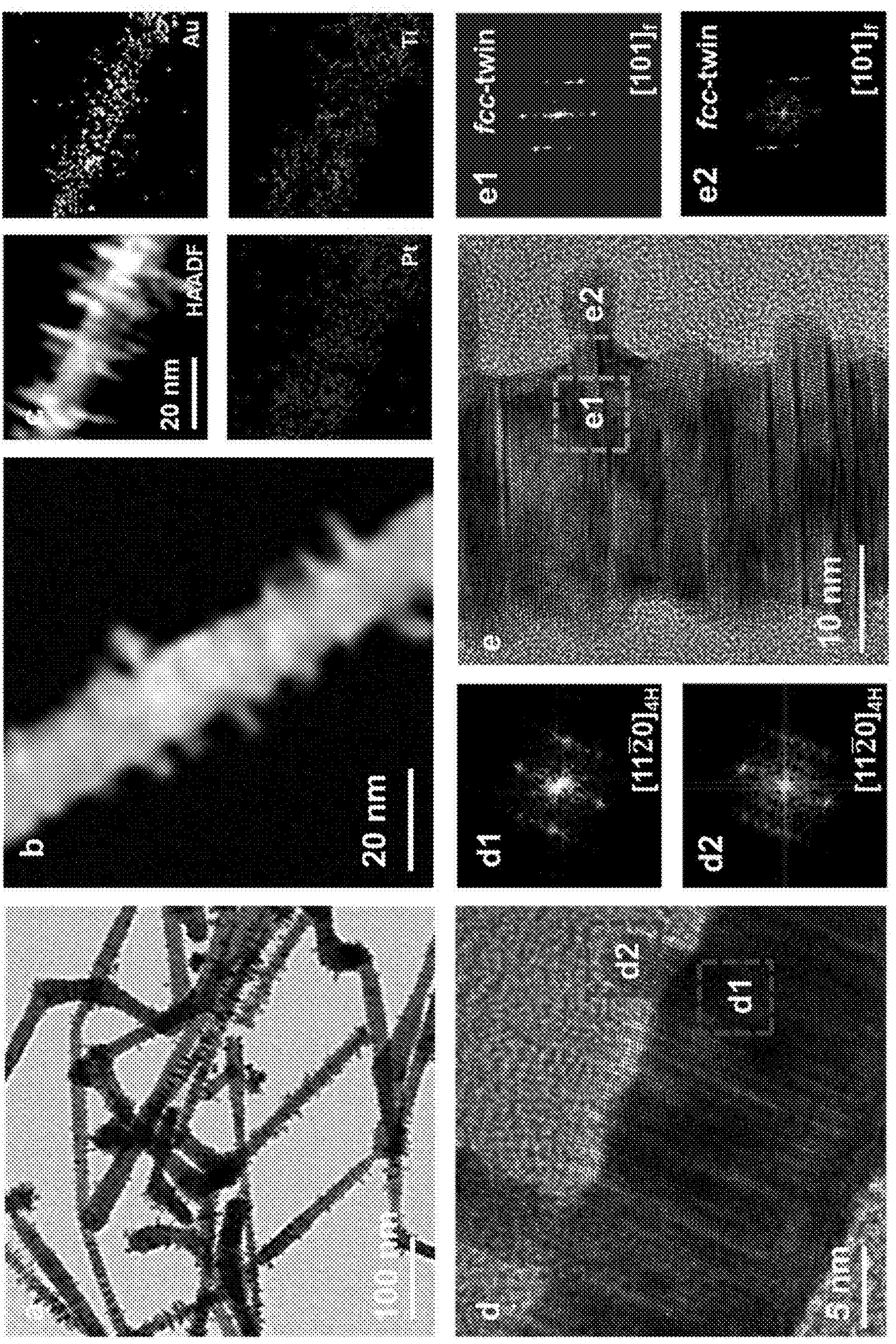
FIG. 17 shows further characterization of 4H/fcc Au@PtTi heterostructure according to some embodiments of the present disclosure.
Figures 18, 19:
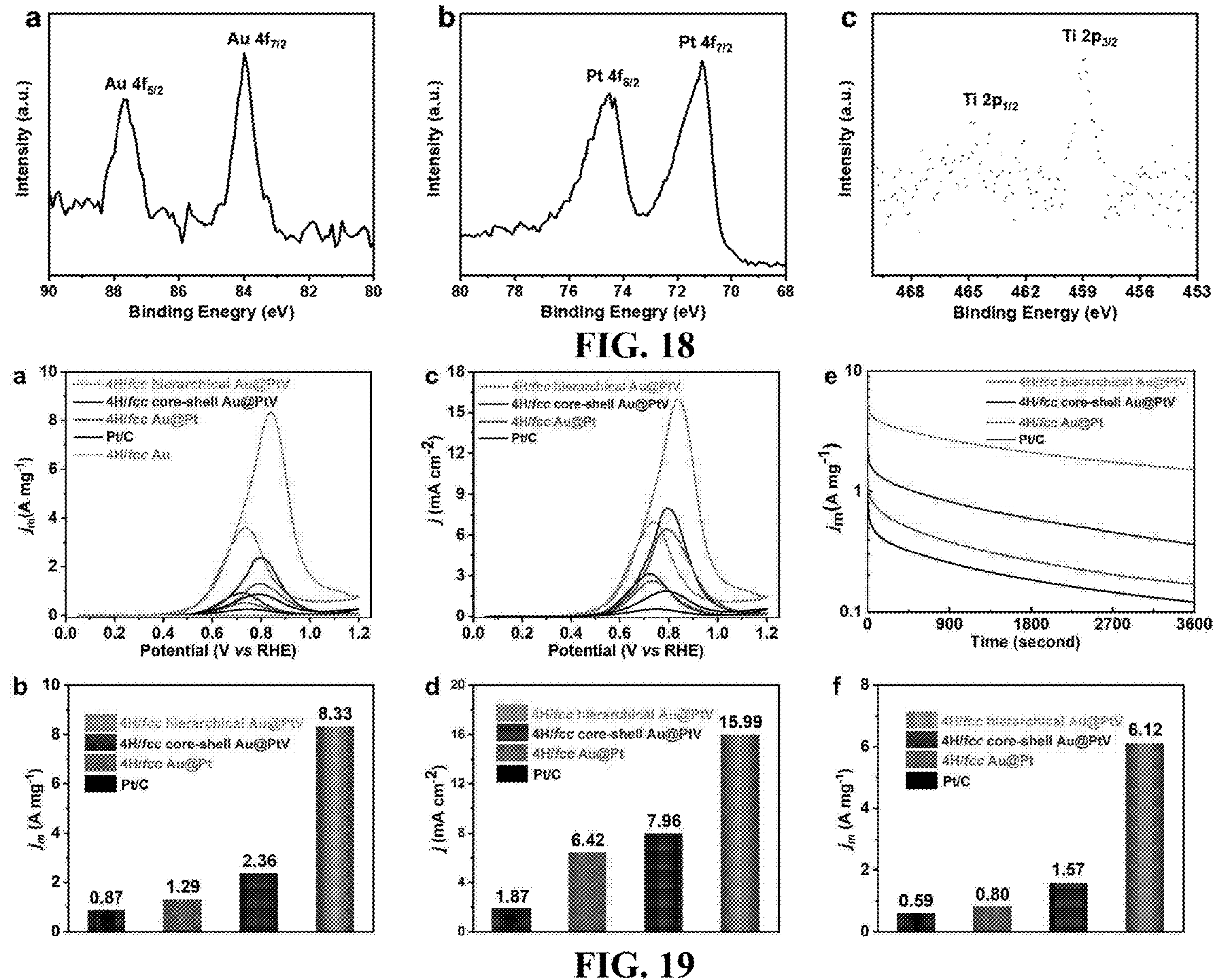
FIG. 18 shows an exemplary XPS pattern of the 4H/fcc hierarchical Au@PtTi heterostructure according to some embodiments of the present disclosure.
FIG. 19 shows exemplary results of the electrochemical measurements according to some embodiments of the present disclosure.

FIG. 16 shows an exemplary XPS pattern of the 4H/fcc core-shell Au@PtTi heterostructure, showing the core level peaks of Au 4f at the section (a), Pt 4f at the section (b), and Ti 2p at the section (c). FIG. 17 shows further characterization of 4H/fcc Au@PtTi heterostructure according to some embodiments of the present disclosure, in which the section (a) of FIG. 17 is an exemplary TEM image of 4H/fcc hierarchical Au@PtTi nanorods; the section (b) of FIG. 17 is an exemplary STEM image of a typical 4H/fcc hierarchical Au@PtTi nanorod; the section (c) of FIG. 17 is an exemplary STEM image and the corresponding EDS elemental mappings; the section (d) of FIG. 17 is an exemplary high-resolution TEM image of a representative 4H/fcc hierarchical Au@PtTi nanorod; the sections (d1) and (d2) of FIG. 17 are FFT images taken from the corresponding dashed squares in the section (d); the section (e) of FIG. 17 is an exemplary high-resolution TEM image of a representative 4H/fcc hierarchical Au@PtTi nanorod, showing the fcc-twin structure in the tiny PtTi nanorod; and the sections (e1) and (e2) of FIG. 17 are exemplary FFT images taken from the corresponding dashed squares in the section (e). FIG. 18 shows an exemplary XPS pattern of the 4H/fcc hierarchical Au@PtTi heterostructure, showing the core level peaks of Au 4f at the section (a), Pt 4f at the section (b), and Ti 2p at the section (c).

The sections (a) and (b) of FIG. 15 show the morphology and elemental distributions of 4H/fcc core-shell Au@PtTi heterostructure. The atomic ratio of Au, Pt and Ti is measured to be 66.4:27.4:6.2 by ICP-OES. The high-resolution TEM image in the section (c) of FIG. 15 and corresponding FFT patterns affirm the 4H/fcc heterophase structure. The chemical states of Au, Pt, and Ti are further revealed by XPS (see FIG. 16). Through carefully tuning the reaction conditions, the morphologies of 4H/fcc Au@PtTi can be precisely controlled, resulting in 4H/fcc hierarchical Au@PtTi heterostructure (see the sections (a) and (b) of FIG. 17). The STEM-EDS elemental mappings demonstrate the growth of tiny PtTi nanorods on the Au nanorods (see the section (c) of FIG. 17). The atomic ratio of Au, Pt and Ti is measured to be 58.1:33.2:8.7 by ICP-OES. The PtTi nanorods exhibit 4H and fcc-twin structure, as confirmed by high-resolution TEM images (see the sections (d) and (e) of FIG. 17), and corresponding FFT patterns (see the section (d1), (d2), (e1), (e2)). The XPS spectra show the chemical states of Au, Pt, and Ti in the 4H/fcc hierarchical Au@PtTi heterostructure (see FIG. 18).

Noble-metal-based heterostructures are promising catalysts for hydrogen evolution reaction, oxygen reduction reaction (ORR), alcohol oxidation reaction (AOR). As a proof-of-concept application, 4H/fcc Au@Pt and 4H/fcc Au@PtV heterostructures can be employed as electrocatalysts for electrochemical methanol oxidation reaction (MOR) and ethanol oxidation reaction (EOR) under alkaline media. Also, the commercial Pt/C catalyst and 4H/fcc Au nanorods are examined as well for comparison. Regarding the electrochemical measurements, a three-electrode system at room temperature can be applied as follows.

In the three-electrode system, the preparation of electrodes is provided in this paragraph. 400 μg of Vulcan XC-72R carbon black are dispersed in 1 mL of ethanol in a 4 mL vial and sonicated in an ice bath for 1 hour to ensure the formation of homogeneous suspension. Subsequently, the catalyst solution containing 100 μg of Pt element, determined by ICP-OES, is dropwisely added into the carbon suspension. The obtained mixture is then sonicated for another 1 hour in an ice bath. After that, the obtained catalyst on carbon (catalyst/C) is collected by centrifugation at 10,000 rpm for 5 min, followed by washing five times with the mixture of chloroform and ethanol (2 mL). Then, the catalyst/C containing 100 μg of Pt is re-dispersed in a mixed solution of isopropanol (693 μL) and Milli-Q water (297 μL). Subsequently, 10 μL of Nafion solution (5%) are added into the mixture which is then sonicated for 30 min. The working electrode is prepared by drop-casting 10 μL of the obtained solution onto a glassy carbon electrode (GCE, diameter of 5 mm), which is pre-polished by $Al_2O_3$ slurry, then cleaned with Milli-Q water and ethanol, yielding a Pt loading of 5.1 μg $cm^{-2}$. The obtained electrode is dried under ambient conditions until the solvent is completely evaporated.

During the electrochemical measurements, GCE coated with catalysts of the present disclosure, Pt wire, and Hg/HgO electrode are employed as working electrode, counter electrode, and reference electrode, respectively. The Hg/HgO electrode is calibrated with respect to a reversible hydrogen electrode (RHE). Before electrocatalytic measurements, the cyclic voltammetry (CV) is employed in N2-saturated 1.0 M KOH electrolyte at a potential range of 0.05-1.20 V (vs. RHE) to remove the ligands on the surface of catalysts. MOR or EOR performance is tested in a N2-saturated 1.0 M KOH aqueous solution containing 1.0 M methanol or 1.0 M ethanol at a scan rate of 50 mV $s^{-1}$. The catalytic durability toward MOR or EOR is tested via chronoamperometric measurements at 0.78 V or 0.77 V (vs. RHE) in N2-saturated 1.0 M KOH aqueous solution containing 1.0 M methanol or ethanol, respectively.

The electrochemically active surface areas (ECSAs) of catalysts are determined by the underpotential hydrogen desorption method in 1.0 M KOH solution. Specifically, the ECSA can be calculated based on the following equation:

$$ECSA = \frac{Q_{H\text{-}desorption}}{m \times 210\ \mu C\ \text{cm}^{-2}}$$

where $Q_{H\text{-}desorption}$ means the charges associated with desorption of hydrogen on Pt surface in the hydrogen desorption region on CV curves, m represents the mass loading of Pt (i.e., $1\times10^{-6}$ g in this work), and the value of 210 μC $cm^{-2}$ is the reference value for the charge of full coverage on the clean Pt surface.

FIG. 19 shows exemplary results of the electrochemical measurements, in which the section (a) of FIG. 19 shows Pt-mass-normalized CV curves of 4H/fcc Au@Pt, 4H/fcc core-shell Au@PtV, 4H/fcc hierarchical Au@PtV, commercial Pt/C and 4H/fcc Au nanorods in $N_2$-saturated 1.0 m KOH aqueous solution containing 1.0 M $CH_3OH$ at scan rate of 50 mV $s^{-1}$; the section (b) of FIG. 19 shows mass activities at their corresponding peak potentials in the CV curves in the section (a); the section (c) of FIG. 19 shows ECSA-normalized CV curves in the section (a); the section (d) of FIG. 19 shows specific activities at their corresponding peak potentials in the CV curves in the section (c); the section (e) of FIG. 19 shows durability evaluation by chronoamperometry tests at 0.78 V vs RHE in $N_2$-saturated 1.0 M KOH aqueous solution containing 1.0 M $CH_3OH$; and the section (f) of FIG. 19 shows Pt-normalized mass activities obtained in $N_2$-saturated 1.0 M KOH aqueous solution containing 1.0 M $CH_3CH_2OH$ at scan rate of 50 mV $s^{-1}$, in which "j" and "$j_m$" represent the specific and mass current density, respectively.

Firstly, cyclic voltammetry (CV) curves are recorded in $N_2$-saturated 1.0 M KOH solution containing 1.0 M methanol to estimate their catalytic MOR activities. As shown in the section (a) of FIG. 19, 4H/fcc hierarchical Au@PtV heterostructure exhibits the greatest Pt-mass-normalized current density in a wide potential range of 0.5-1.2 V (vs. Reversible Hydrogen Electrode (RHE)) compared to other catalysts, and the 4H/fcc Au nanorods show almost no activity. The mass activities of 4H/fcc Au@Pt, 4H/fcc Au@PtV heterostructures and commercial Pt/C catalyst for MOR at their peak potentials are further calculated (see the section (b) of FIG. 19). Remarkably, the 4H/fcc hierarchical Au@PtV catalyst shows the highest mass activity of 8.33 Å $mg_{Pt}^{-1}$, which is 3.5, 6.4, and 9.6 times those of core-shell Au@PtV (2.36 A $mg_{Pt}^{-1}$), Au@Pt (1.29 A $mg_{Pt}^{-1}$), and commercial Pt/C (0.87 A $mg_{Pt}^{-1}$) catalysts, respectively. The mass activity of 4H/fcc hierarchical Au@PtV heterostructure is also better than those of most of the previously reported Pt-based catalysts, as shown in Table I below.

TABLE I

Comparison of the electrocatalytic performances of Pt-based catalysts toward MOR in related works and the present disclosure.

| Catalysts | Electrolytes | Mass activity ($A\ mg^{-1}$) |
|---|---|---|
| 4H/fcc hierarchical Au@PtV | 1.0M KOH + 1.0M methanol | 8.33 |
| Single-atom Ni modified Pt nanowires | 1.0M KOH + 1.0M methanol | 7.93 |
| Pt/Ni$(OH)_2$/reduced graphene oxide | 1.0M KOH + 1.0M methanol | 1.07 |
| PtZn/multi-wall carbon nanotubes | 0.1M KOH + 0.5M methanol | 0.54 |
| 3D anisotropic Au@Pt—Pd | 1.0M KOH + 1.0M methanol | 4.38[a] |
| Au@ PdPt core-shell nanorods | 1.0M KOH + 1.0M methanol | 4.83[a] |
| PtCuNi tetrahedra | 1.0M KOH + 1.0M methanol | 7.0 |
| PtCu nanoframes | 0.5M KOH + 1.0M methanol | 2.26 |
| Single-atom Pt on $RuO_2$ | 0.1M KOH + 1.0M methanol | 6.77 |
| PtCuPd@Ru yolk-cage nanoplates | 1.0M KOH + 2.0M methanol | 2.48[a] |
| Pt—Co nanoframes | 1.0M KOH + 1.0M methanol | 4.28 |
| Single-atom Pt on Ru nanoparticles | 0.1M $HClO_4$ + 1.0M methanol | 1.58 |
| Atomic-layer-Pt/$Pt_3Ga$ | 0.5M $H_2SO_4$ + 1M Methanol | 1.09 |
| $Pt_3V$ intermetallic nanoparticle | 0.1M $HClO_4$ + 1M methanol | 0.20 |

[a]Pt and Pd- mass normalized peak current (A $mg_{Pt+Pa}^{-1}$).

Figure 20:
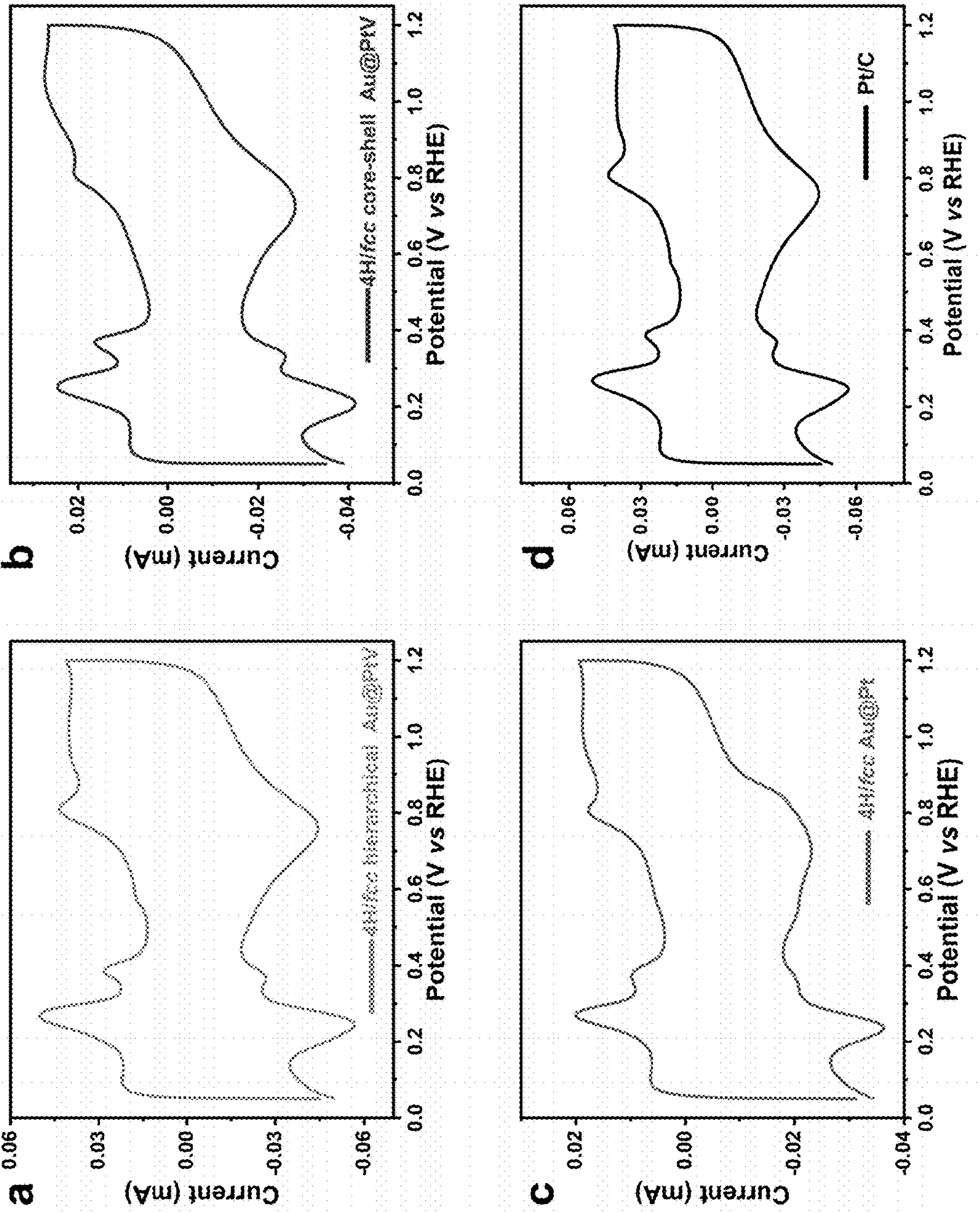
FIG. 20 shows exemplary cyclic voltammetry (CV) curves according to some embodiments of the present disclosure.

FIG. 20 shows exemplary cyclic voltammetry (CV) curves of 4H/fcc hierarchical Au@PtV heterostructure at the section (a), 4H/fcc core-shell Au@PtV heterostructure at the section (b), 4H/fcc Au @Pt hetero structure at the section (c), and commercial Pt/C at the section (d). To unravel their intrinsic catalytic activities, the specific activities of Pt-based catalysts are calculated by normalizing their currents to the corresponding electrochemically active surface areas (ECSAs). As shown in FIG. 20, the CV curve of 4H/fcc hierarchical Au@PtV heterostructure shows a stronger hydrogen absorption peak compared to those of 4H/fcc core-shell Au@PtV, 4H/fcc Au@Pt and Pt/C catalysts. The ECSA of 4H/fcc hierarchical Au@PtV heterostructure is calculated as 52.1 $m^2\ g_{pt}^{-1}$, which is about 1.8, 2.8, and 1.1 times those of 4H/fcc core-shell Au@PtV (29.6 $m^2\ g_{pt}^{-1}$), 4H/fcc Au@Pt (18.7 $m^2\ g_{pt}^{-1}$), and commercial Pt/C (46.4 $m^2\ g_{pt}^{-1}$), respectively. As shown in the section (c) of FIG. 19, the 4H/fcc hierarchical Au@PtV heterostructure still exhibits the highest ECSA-normalized current density in a wide potential range. The specific activities increase in the sequence of Pt/C (1.87 mA $cm^{-2}$)<4H/fcc Au@Pt (6.42 mA $cm^{-2}$)<4H/fcc core-shell Au@PtV (7.96 mA $cm^{-2}$)<4H/fcc hierarchical Au@PtV (15.99 mA $cm^{-2}$) (see the section (d) of FIG. 19). This result suggests that the heterophase structure, incorporation of V, and hierarchical morphology could significantly facilitate the intrinsic catalysis behavior of Pt catalysts.

Figure 21:
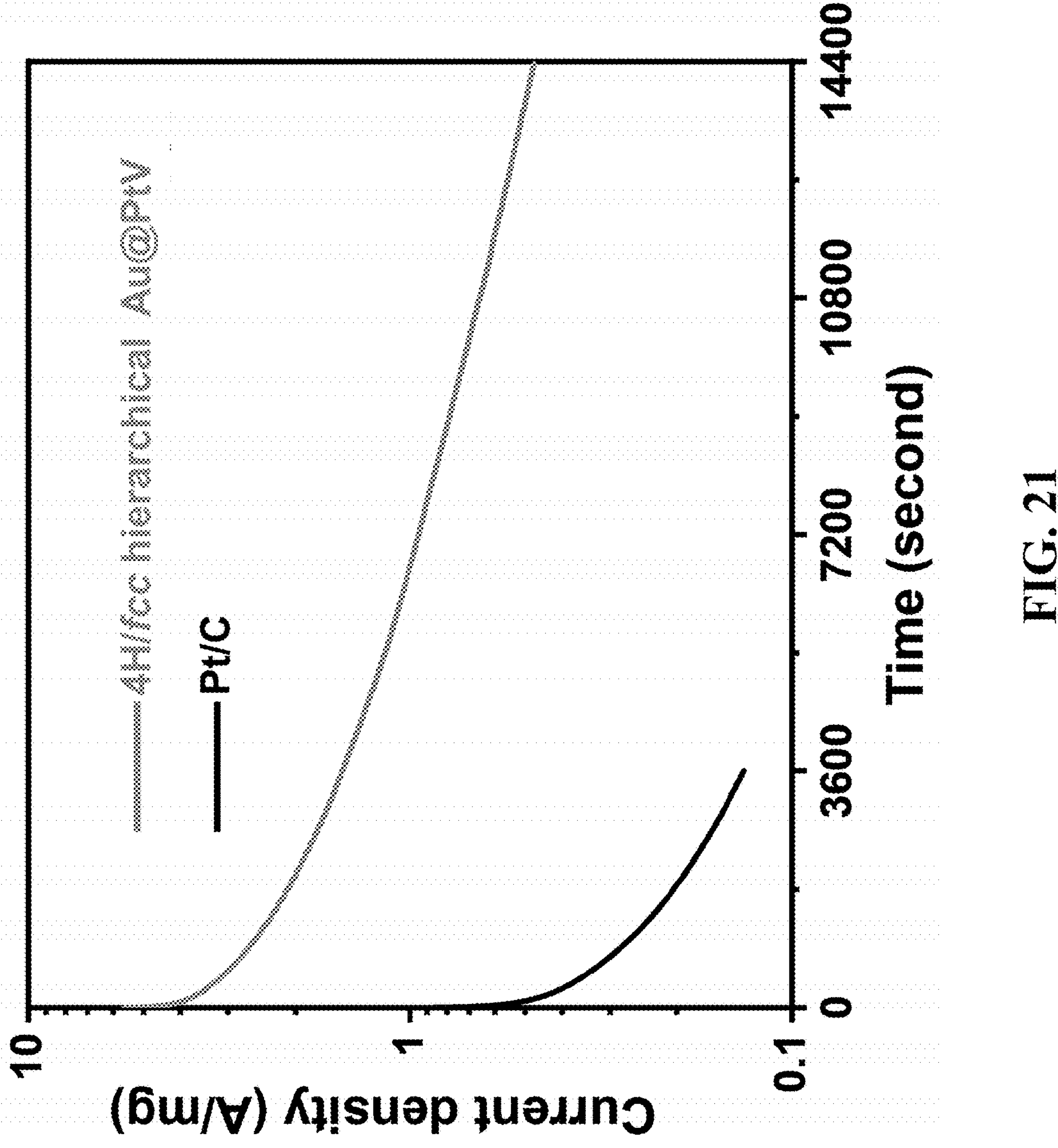
FIG. 21 shows exemplary durability evaluation of the 4H/fcc hierarchical Au@PtV heterostructure according to some embodiments of the present disclosure.
Figure 22:
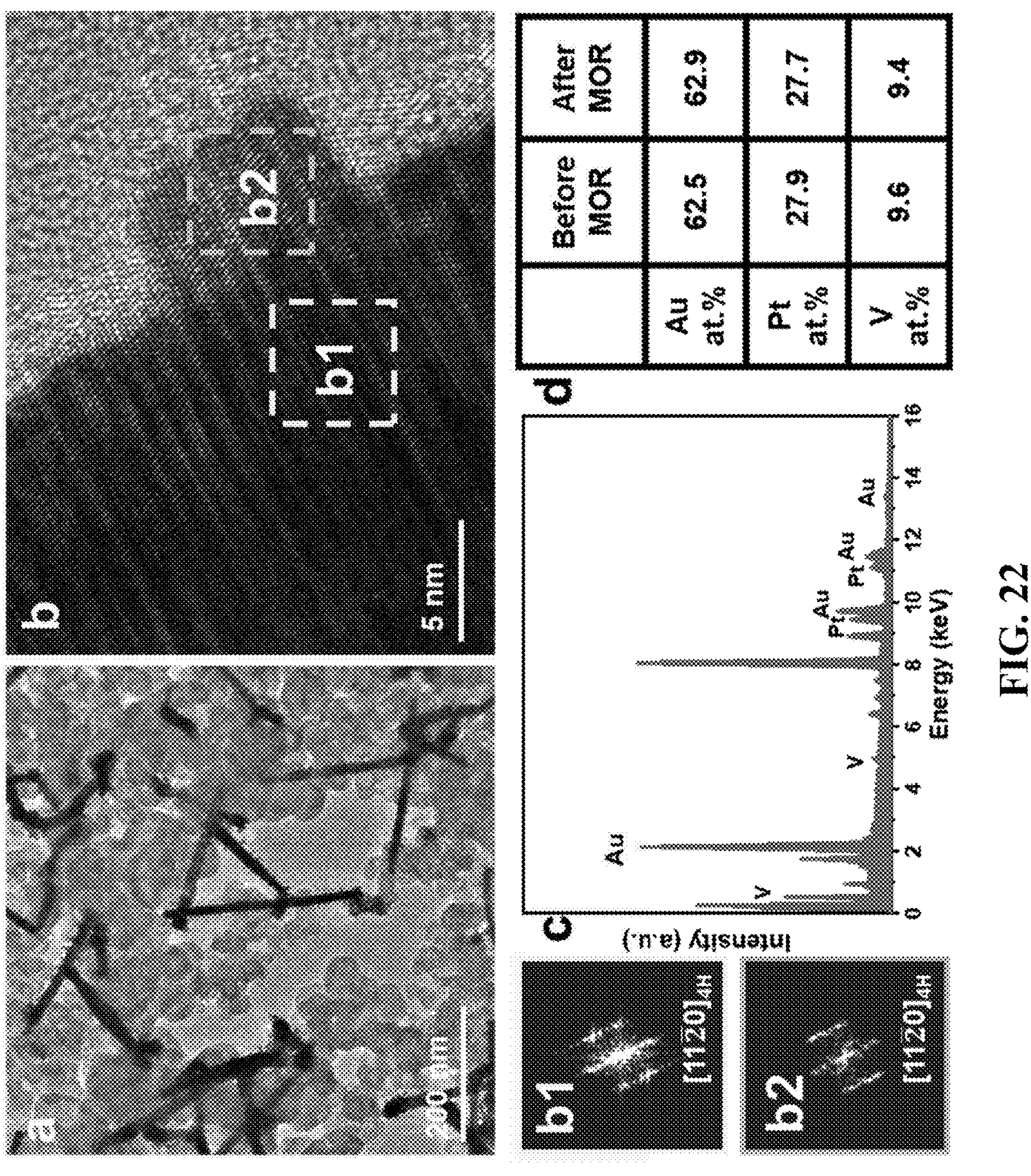
FIG. 22 shows characterization of the 4H/fcc hierarchical Au@PtV heterostructure according to some embodiments of the present disclosure.

FIG. 21 shows exemplary durability evaluation of the 4H/fcc hierarchical Au@PtV heterostructure by chronoamperometry tests in $N_2$-saturated 1.0 M KOH aqueous solution containing 1.0 M $CH_3OH$ at 0.78 V vs RHE. The current density of the commercial Pt/C catalyst quickly declined in the first 3600 seconds. FIG. 22 shows characterization of the 4H/fcc hierarchical Au@PtV heterostructure after the MOR stability (14400 s) test, in which the section (a) of FIG. 22 is an exemplary TEM image of the 4H/fcc hierarchical Au@PtV heterostructure loaded on carbon; the section (b) of FIG. 22 is an exemplary high-resolution TEM image of a typical 4H/fcc hierarchical Au@PtV nanorod and the corresponding FFT patterns; the section (c) of FIG. 22 is an exemplary represented EDS spectrum of the 4H/fcc hierarchical Au@PtV heterostructure after stability test; the section (d) of FIG. 22 is exemplary comparison of the atomic ratios (at. %) of Au, Pt, V in the 4H/fcc hierarchical Au@PtV heterostructure before and after the stability test based on the ICP-OES.

Apart from the electrocatalytic activity, durability is also an important factor for the MOR. Herein, the stability of 4H/fcc Au@Pt, 4H/fcc Au@PtV heterostructures and commercial Pt/C are assessed by chronoamperometric measurement over 3600 seconds. As shown in the section (e) of FIG. 19, the 4H/fcc hierarchical Au@PtV heterostructure exhibits much improved stability compared to other catalysts. After 3600 seconds, it maintains a high mass activity of 1.51 A $mg_{Pt}^{-1}$, which is 4.2, 8.9, and 12.6 times those of 4H/fcc core-shell Au@PtV (0.36 A $mg_{Pt}^{-1}$), 4H/fcc Au@Pt (0.17 A $mg_{Pt}^{-1}$), and Pt/C (0.12 A $mg_{Pt}^{-1}$) catalysts, respectively. Notably, a high mass activity of 0.47 A $mg_{Pt}^{-1}$ for the 4H/fcc hierarchical Au@PtV is still preserved after testing for 14400 seconds, as shown in FIG. 21, further confirming its superior durability for the MOR. Moreover, the 4H/fcc hierarchical Au@PtV catalyst is recollected after this chronoamperometry test and characterized by TEM and EDS, as shown in FIG. 22. The results show negligible changes in the morphology and composition after the long-term chronoamperometric test, indicating the outstanding structural stability of 4H/fcc hierarchical Au@PtV heterostructure.

Figure 23:
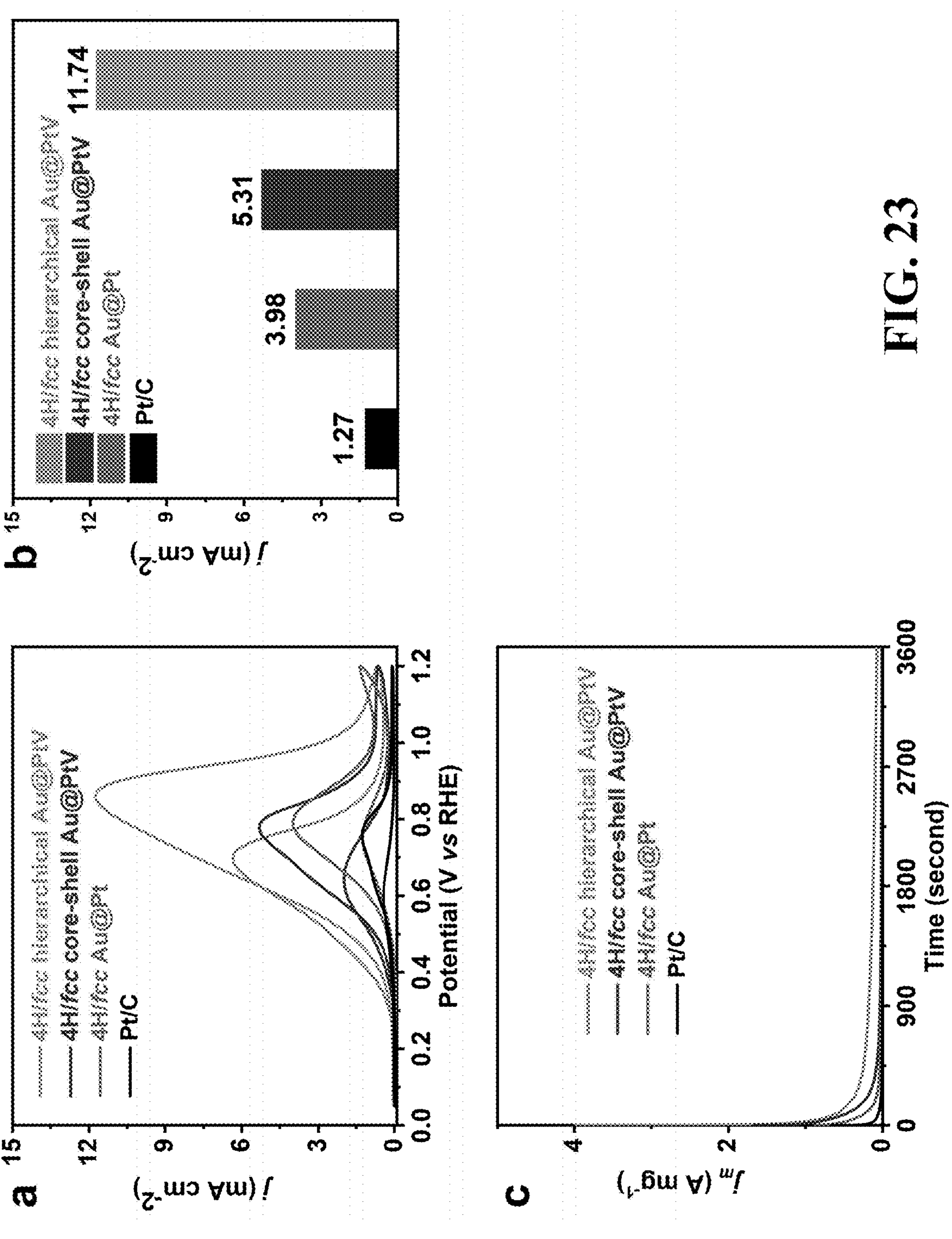
FIG. 23 shows exemplary results of the electrochemical measurements according to some embodiments of the present disclosure.

FIG. 23 shows exemplary results of the electrochemical measurements, in which the section (a) of FIG. 23 shows ECSA-normalized CV curves of 4H/fcc Au@Pt and two types of 4H/fcc Au@PtV heterostructures and commercial Pt/C in $N_2$-saturated 1.0 m KOH aqueous solution containing 1.0 M $CH_3CH_2OH$ at a scan rate of 50 mV $s^{-1}$; the section (b) of FIG. 23 shows specific activities of 4H/fcc Au@Pt and two types of 4H/fcc Au@PtV heterostructures and commercial Pt/C at their corresponding peak potentials in the CV curves in the section (a); and the section (c) of FIG. 23 shows durability evaluation of the 4H/fcc Au@Pt and two types of 4H/fcc Au@PtV heterostructures and commercial Pt/C by chronoamperometry tests in $N_2$-saturated 1.0 M KOH aqueous solution containing 1.0 M $CH_3CH_2OH$ at 0.77 V vs RHE.

Besides MOR, the electrocatalytic performances of 4H/fcc Au@Pt and 4H/fcc Au@PtV heterostructures toward EOR are also studied, as shown in the section (f) of FIG. 19, FIG. 23, and Table II below. The 4H/fcc hierarchical Au@PtV heterostructure exhibits the highest mass activity of 6.12 A $mg_{Pt}^{-1}$ (FIG. 4*f*), which is 3.9, 7.6, and 10.4 times those of the 4H/fcc core-shell Au@PtV (1.57 A $mg_{Pt}^{-1}$), 4H/fcc Au@Pt (0.80 A $mg_{Pt}^{-1}$), and Pt/C (0.59 A $mg_{Pt}^{-1}$) catalysts, respectively, and is also better than those of many representative Pt-based catalysts towards EOR, which can be found in Table II. Moreover, the 4H/fcc hierarchical Au@PtV heterostructure also exhibit excellent specific activity toward the EOR, in which the highest specific activity of 11.74 mA $cm^{-2}$ is achieved on the 4H/fcc hierarchical Au@PtV heterostructure (see the section (b) of FIG. 23). In addition, the 4H/fcc hierarchical Au@PtV heterostructure still maintains a mass activity of 0.072 A $mg_{Pt}^{-1}$ after testing for 3600 seconds (see the section (c) of FIG. 23), while other catalysts exhibit negligible mass activities, indicating the superior electrocatalytic stability of 4H/fcc hierarchical Au@PtV heterostructure.

TABLE II

Comparison of the electrocatalytic performances of Pt-based catalysts toward EOR in related works and the present disclosure.

| Catalysts | Electrolytes | Mass activity (A $mg^{-1}$) |
|---|---|---|
| 4H/fcc hierarchical Au@PtV | 1.0M KOH + 1.0M ethanol | 6.12 |
| Single-atom Ni modified Pt nanowires | 1.0M KOH + 1.0M ethanol | 5.60 |
| PtCuNi tetrahedra | 1.0M KOH + 1.0M ethanol | 5.6 |
| 3D anisotropic Au@Pt—Pd | 1.0M KOH + 1.0M ethanol | 3.18[a] |
| Au@ PdPt core-shell nanorods | 1.0M KOH + 1.0M ethanol | 3.89[a] |
| Porous PtRhCu cubic nanoboxes | 1.0M KOH + 1.0M ethanol | 4.09[a] |
| Hierarchical Pt—Cu superstructures | 0.5M KOH + 2.0M ethanol | 0.4 |
| Multilayer m-Pd/PdPt film | 1.0M KOH + 0.5M ethanol | 1.04 |
| Ultrathin Pd—Pt—Ag nanosheets | 0.1M KOH + 0.5M ethanol | 1.34[a] |
| Monodispersed Ga tailored $Pt_3Mn$ | 0.1M HC104 + 0.5M ethanol | 0.61 |
| Ultrathin Pt—Mo—Ni nanowires | 0.5M H2SO4 + 2M ethanol | 0.86 |

[a]Pt and Pd/Rh-mass normalized peak current (A $mg_{Pt+Pd/Rh}^{-1}$).

Figure 24:
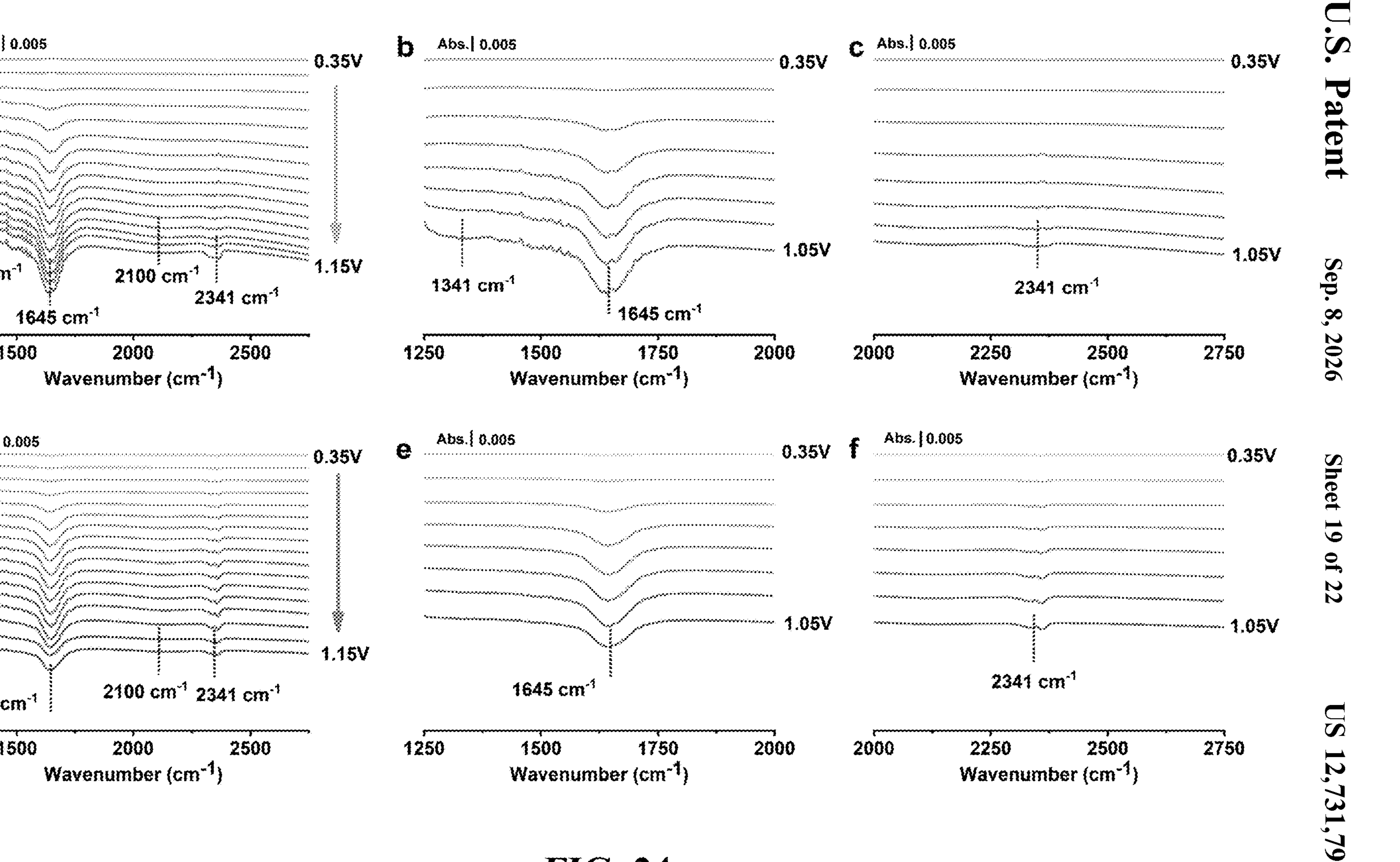
FIG. 24 shows exemplary results of the electrochemical measurements according to some embodiments of the present disclosure.
Figure 25:
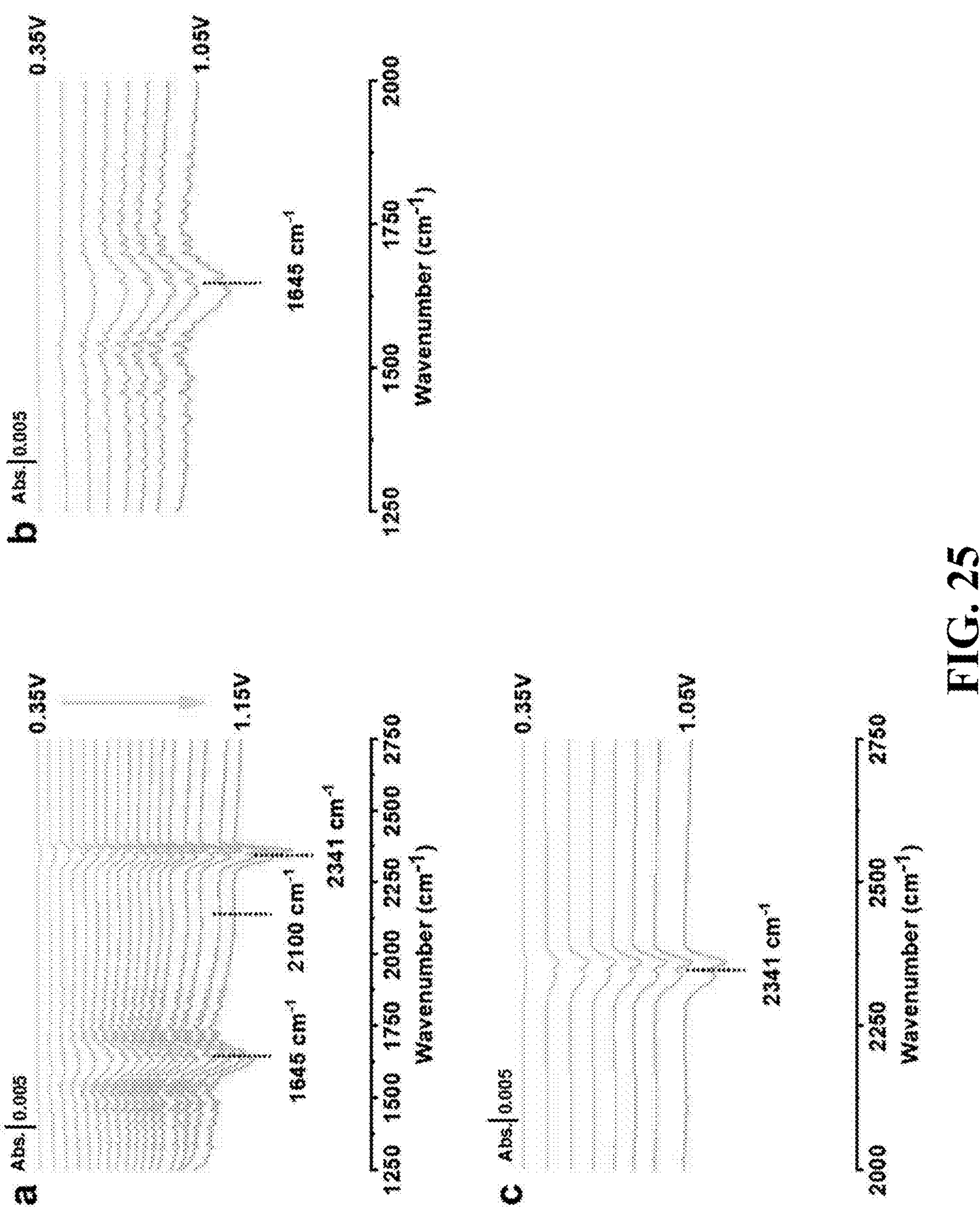
FIG. 25 shows exemplary Operando infrared reflection absorption spectroscopy studies of the electrochemical MOR on the 4H/fcc Au@Pt nanorods according to some embodiments of the present disclosure.

FIG. 24 shows exemplary results of the electrochemical measurements, in which the sections (a)-(c) of FIG. 24 show real-time operando infrared reflection absorption spectroscopy spectra recorded during the electrochemical MOR on the 4H/fcc hierarchical Au@PtV catalyst; sections (d)-(f) of FIG. 24 show Real-time operando infrared reflection absorption spectroscopy spectra recorded during the electrochemical MOR on the 4H/fcc core-shell Au@PtV catalyst in aqueous solution containing 1.0 M methanol and 1.0 M KOH. FIG. 25 shows exemplary Operando infrared reflection absorption spectroscopy studies of the electrochemical MOR on the 4H/fcc Au@Pt nanorods.

To gain deep insights into the reaction mechanism and product selectivity during MOR, operando infrared reflection absorption spectroscopy studies on 4H/fcc hierarchical Au@PtV (see sections (a)-(c) of FIG. 24), 4H/fcc core-shell Au@PtV (see sections (d)-(f) of FIG. 24) and 4H/fcc Au@Pt (see sections (a), (b), (c) of FIG. 25) are carried out. MOR commonly proceeds via CO or non-CO pathways. In the CO pathway, the CO oxidation to produce $CO_2$ is the last step for complete oxidation of methanol. In the non-CO pathway, the formate is the reactive intermediates and the conversion of formate to $CO_2$ possesses a lower activation energy compared to that of CO oxidation, which is preferred in MOR. As shown in FIGS. 5*a* and 5*d*, the linearly adsorbed CO ($CO_L$) species on 4H/fcc Au@PtV catalysts are observed at the characteristic band of ~2100 $cm^{-1}$, indicating CO is the reactive intermediates on both 4H/fcc core-shell and hierarchical Au@PtV catalysts. As shown in the sections (b) and (e) of FIG. 24, the band at around 1645 $cm^{-1}$ may be due to the bending mode of interfacial water, which could contribute to the generation of oxygenated species (e.g., OH). The OH species adsorbed on the surface of catalysts boost the CO oxidation, which alleviates the poisoning of Pt and thus improves the performances of MOR. The characteristic peaks in the sections (c) and (f) of FIG. 24 are contributed to the asymmetric stretch vibration of $CO_2$, revealing the complete oxidation of methanol by 6 electrons transferring process on both 4H/fcc core-shell and hierarchical Au@PtV catalysts. Note that for 4H/fcc hierarchical Au@PtV catalyst, the band at ~1341 $cm^{-1}$ can be assigned to the symmetric OCO stretching mode of bridge-bonded formate ($HCOO_B$), indicating the methanol oxidation on the 4H/fcc hierarchical Au@PtV catalyst proceeds by both CO and non-CO pathways. As shown in the section (e) of FIG. 24, the signal of $HCOO_B$ is absent on the 4H/fcc core-shell Au@PtV catalyst, suggesting methanol oxidation follows a CO pathway on the 4H/fcc core-shell Au@PtV catalyst. The reaction pathway of methanol oxidation on 4H/fcc Au@Pt is similar to that of 4H/fcc core-shell Au@PtV catalyst (see sections (a), (b), (c) of FIG. 25). For 4H/fcc hierarchical Au@PtV heterostructure, the generated $HCOO_B$ intermediates could facilitate C—H cleavage to produce $CO_2$, which possesses a low activation energy and fast kinetics. The presence of non-CO pathway accounts for the larger current density of electrochemical MOR on the 4H/fcc hierarchical Au@PtV catalyst.

Figure 26:
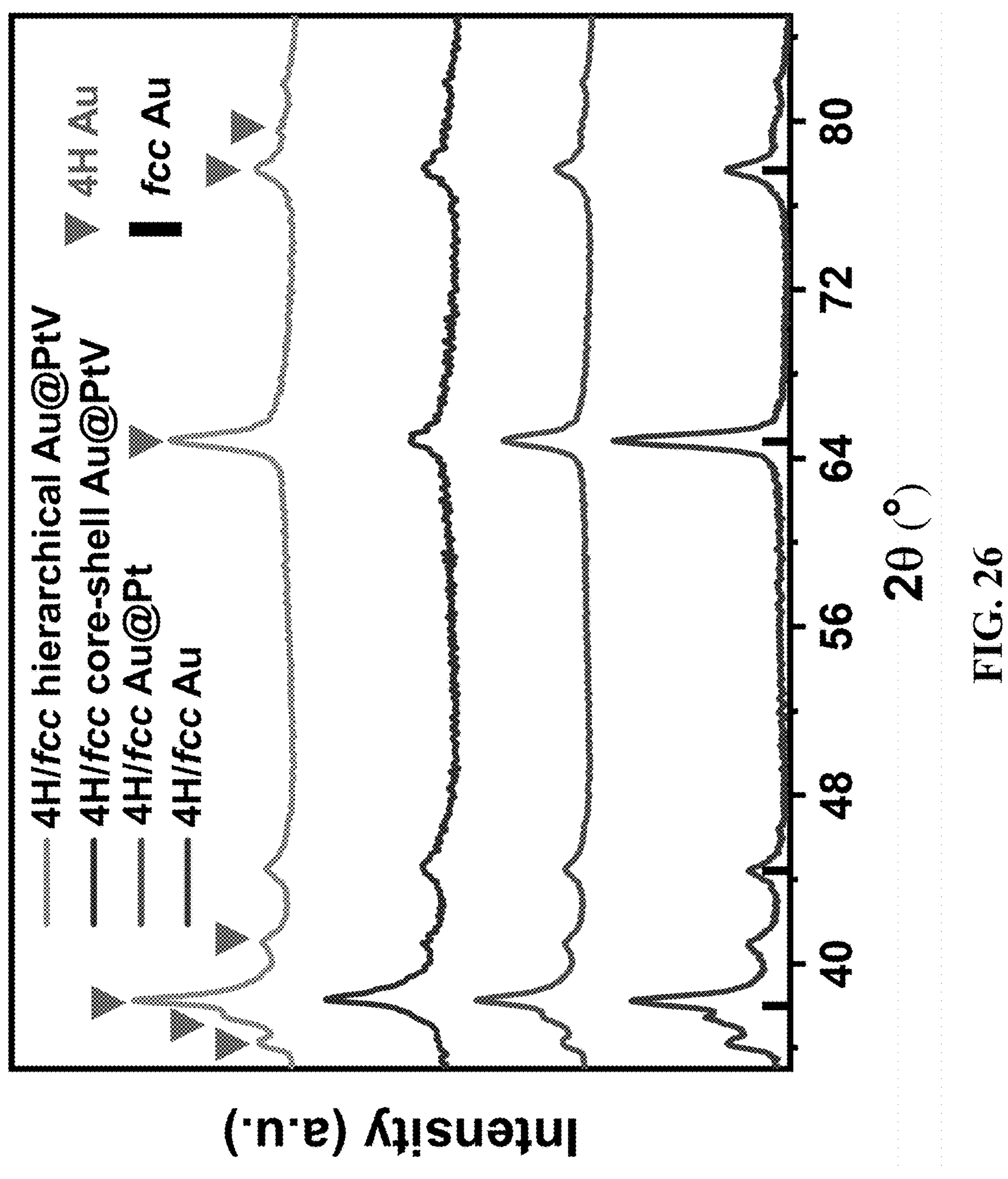
FIG. 26 shows exemplary XRD characterization of 4H/fcc Au nanorods according to some embodiments of the present disclosure.

FIG. 26 shows exemplary X-ray diffraction (XRD) characterization of 4H/fcc Au nanorods, 4H/fcc Au@Pt, 4H/fcc core-shell Au@PtV, and 4H/fcc hierarchical Au@PtV catalysts, in which All XRD patterns are collected in the θ/2θ mode.

The superior electrocatalytic performances of 4H/fcc hierarchical Au@PtV heterostructure could also be ascribed to the following reasons. First, hierarchical Au@PtV heterostructure crystallizes in 4H/fcc heterophase with large amounts of crystal phase boundaries (see FIG. 26), which can serve as additional catalytic active sites and thus enhance the alcohol oxidation activity. Second, in the 4H/fcc hierarchical Au@PtV heterostructure, there are multiple branches with 4H phase and fcc-twin boundaries (see FIG. 9), which can provide abundant active sites for MOR and EOR (see FIG. 20). Third, compared to Pt $(0004)_{4H}$ in the 4H/fcc Au@Pt and PtV $(0004)_{4H}$ in the 4H/fcc core-shell Au@PtV heterostructure, the lattice compression of PtV $(0004)_{4H}$ in the 4H/fcc hierarchical Au@PtV catalyst can be clearly observed in HAADF-STEM images (see the section of FIG. 9). This lattice variation could also regulate their electronic structures, as indicated by the Pt 4f XPS spectra (see FIG. 14). The modified lattice and electronic structure could modify the adsorption interaction with the intermediates during alcohol oxidation, contributing to the enhanced catalytic activities.

Figure 27:
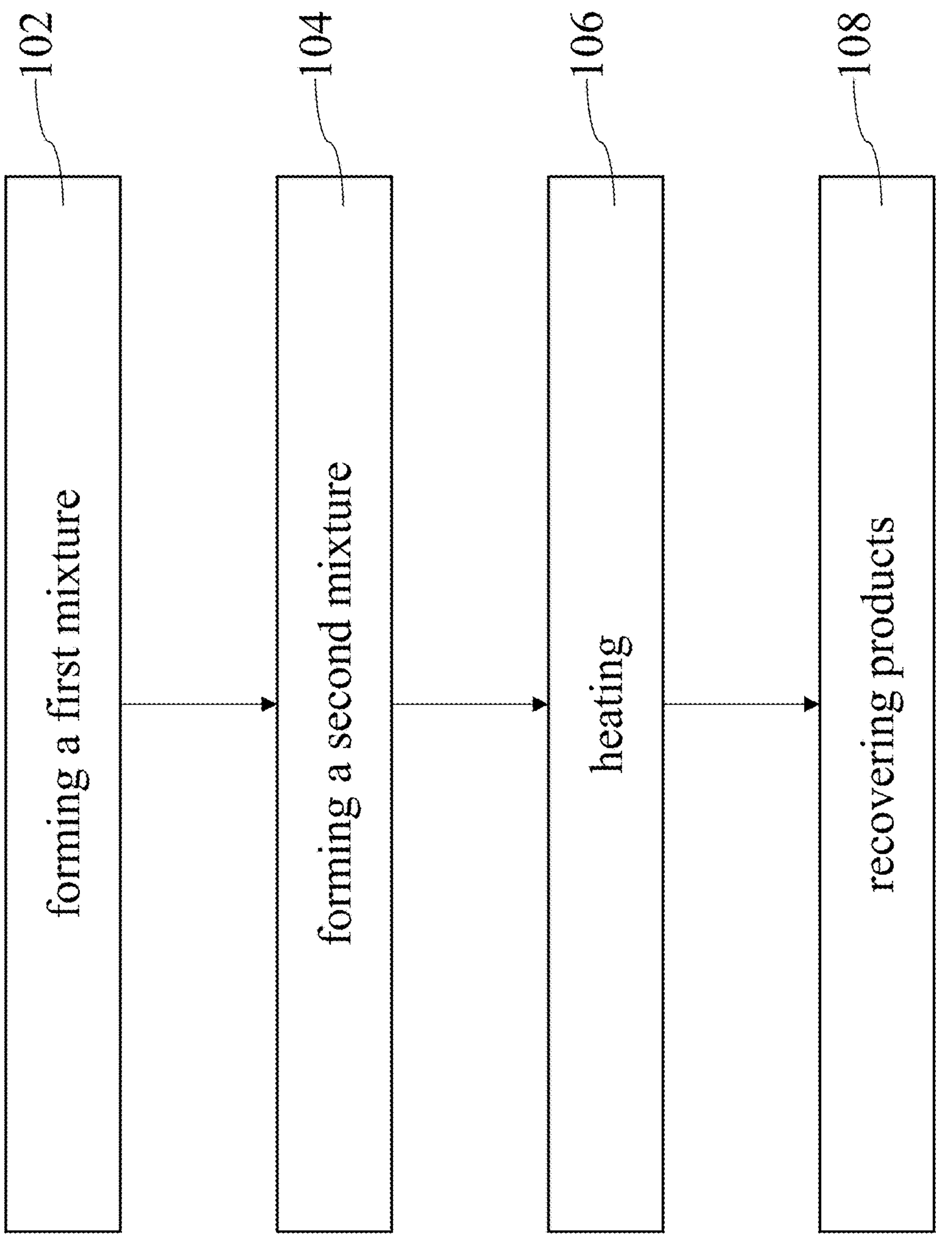
FIG. 27 illustrates a flowchart showing a general method for synthesis of heterogeneous catalyst for alcohol oxidation reaction of an anode reaction in direct alcohol fuel cells according to some embodiments of the present disclosure.

FIG. 27 illustrates a flowchart showing a general method for synthesis of heterogeneous catalyst for alcohol oxidation reaction of an anode reaction in direct alcohol fuel cells. A general synthesis method for 4H/fcc heterophase Pt-based nanocatalysts is provided, which can serve as highly efficient heterogeneous catalysts for the essential anode reaction in direct alcohol fuel cells (DAFCs) known as alcohol oxidation reaction (AOR) under alkaline conditions. Specifically, the as-synthesized 4H/fcc heterophase Pt-based nanocatalysts, particularly 4H/fcc hierarchical Au@PtV nanomaterials, demonstrate advanced electrocatalytic properties for AOR, exhibiting high activity and excellent long-term stability. These findings contribute to the development of advanced electrocatalysts with practical applications. Additionally, the synthesized heterophase Pt-based nanomaterials show great advantages over existing catalysts in various catalytic reactions, including electrocatalysis. For instance, in the case of electrochemical methanol oxidation reaction (MOR), platinum-group noble metals like Pt and Pd are widely recognized as highly efficient catalysts.

The method for synthesis (i.e., synthesis process) at least includes steps 102, 104, 106, and 108 which serve as general stages, in which the method can further includes other steps or be tuned to have different reaction conditions, thereby adjusting morphologies for core-shell and hierarchical morphologies.

In the step 102, a material A selected from platinum(II) bis(acetylacetonate), vanadium(III) acetylacetonate, and titanium oxide acetylacetonate with a solvent B selected from oleylamine and 1-octadecene to form a first mixture. In the step 104, a dispersion of C 4H/fcc Au nanorods is added into the first mixture to form a second mixture. In some embodiments, A, B, and C are positive and a ratio of A to B is in a range from 0.5 to 2, and a and a ratio of A to C is in a range from 2 to 6. In the step 106, the second mixture is heated at a temperature in a range from 150° C. to 200° C. for a time period in a range from 5 hours to 15 hours. In the step 108, products recovered to obtain a 4H/fcc Pt-based heterostructure with Au from the second mixture. Specifically, the product from the synthesis process includes at least one Pt-based nanoisland deposited on an Au nanorod with 4H/fcc heterophase.

For the synthesis of 4H/fcc core-shell Au—Pt heterostructure, 2.0 mg $Pt(acac)_2$ and 20.0 mg ascorbic acid can be added into a 15 ml Schlenk tube containing 2.0 ml oleylamine to form a first mixture. Subsequently, the first mixture can be sonicated for 30 minutes. After that, 0.75 ml of the as-prepared 4H/fcc Au nanorods dispersed in hexane are added into the first mixture, thereby forming a second mixture. The Schlenk tube with the second mixture is then evacuated for 30 minutes at room temperature and purged with $N_2$ under magnetic stirring. Thereafter, the second mixture is heated to 170° C. and kept for 5 hours. Finally, the as-obtained product is washed 3 times with the second mixture of hexane and ethanol by centrifugation at 5000 r.p.m. for 3 minutes. In some embodiments, during the synthesis process, the Pt-based nanoisland epitaxially grows from the Au nanorod so as to form the 4H/fcc core-shell Au—Pt heterostructure with the Au nanorod serving as a seed. In some embodiments, the Pt-based nanoisland can form a Pt shell with an average thickness in a range from 4.2 nm to 5.2 nm on the Au nanorod.

In an embodiment involving synthesis of a 4H/fcc core-shell Au—PtV heterostructure, the first mixture is formed by mixing the platinum(II) bis(acetylacetonate) and the vanadium(III) acetylacetonate with a weight ratio in a range from 0.5 to 1. For example, for the synthesis of 4H/fcc heterophase core-shell Au@PtV nanomaterials, 2.0 ml 1-octadecene are first mixed with 2.0 ml oleylamine in a 15 ml Schlenk tube. Then, 2.0 mg $Pt(acac)_2$, 4.0 mg $V(acac)_3$, and 20.0 mg ascorbic acid are added into the solution to form the first mixture. Subsequently, the first mixture is sonicated for 30 minutes. After that, 2.0 mg tetraoctylammonium bromide and 0.75 ml of the as-prepared 4H/fcc Au nanorods dispersed in hexane are added into the first mixture, thereby forming the second mixture. The Schlenk tube with the second mixture is evacuated for 30 minutes at room temperature and purged with $N_2$ under magnetic stirring. The second mixture is then heated to 180° C. and kept for 5 hours. Finally, the as-obtained product is washed 3 times with the second mixture of hexane and ethanol by centrifugation at 5000 r.p.m. for 3 minutes. In some embodiments, during the synthesis process, the Pt-based nanoisland including vanadium epitaxially grows from the Au nanorod so as to form the 4H/fcc core-shell Au—PtV heterostructure with the Au nanorod serving as a seed. In some embodiments, the Pt-based nanoisland can form a PtV shell with an average thickness in a range from 3.3 nm to 5.1 nm on the Au nanorod.

In an embodiment involving synthesis of a 4H/fcc core-shell Au—PtTi heterostructure, the first mixture is formed by mixing the platinum(II) bis(acetylacetonate) and the titanium oxide acetylacetonate with a weight ratio in a range from 0.5 to 1. In this regard, the synthesis condition of a 4H/fcc heterophase core-shell Au@PtTi heterostructure is similar to that of Au@PtV nanostructure, except the $V(acac)_3$ is replaced by the titanium oxide acetylacetonate and the reaction temperature is increased to 185° C. The Pt-based nanoisland including titanium can epitaxially grow from the Au nanorod so as to form a 4H/fcc core-shell Au—PtTi heterostructure with the Au nanorod serving as a seed.

In an embodiment involving synthesis of a 4H/fcc heterophase hierarchical Au—PtV heterostructure, the first mixture is formed by mixing the platinum(II) bis(acetylacetonate) and the vanadium(III) acetylacetonate with a weight ratio in a range from 0.5 to 1. For example, for the synthesis of a 4H/fcc heterophase hierarchical Au@PtV heterostructure, 2.0 mg $Pt(acac)_2$ and 3.0 mg $V(acac)_3$ are added into a 15 ml Schlenk tube containing 2.0 ml oleylamine to form a first mixture. Subsequently, the first mixture is sonicated for 30 minutes. Then, 5.0 mg tetraoctylammonium bromide and 0.75 ml of the as-prepared 4H/fcc Au nanorods dispersed in hexane are added into the first mixture, forming a second mixture. The Schlenk tube with the second mixture is evacuated for 30 minutes at room temperature to remove the hexane under magnetic stirring. The second mixture is heated to 190° C. and kept for 12 hours. Finally, the as-obtained product is washed 3 times with the second mixture of hexane and ethanol by centrifugation at 5000 r.p.m. for 3 minutes. In some embodiments, during the synthesis process, the Pt-based nanoisland including vanadium can epitaxially grow from the Au nanorod so as to form a 4H/fcc heterophase hierarchical Au—PtV heterostructure with the Au nanorod serving as a seed. In some embodiments, the Pt-based nanoisland including vanadium extends vertically from the Au nanorod along a direction different than a longitudinal axis of the Au nanorod (e.g., orthogonal to the longitudinal axis of the Au nanorod) so as to form PtV nanorods on the Au nanorod. In some embodiments, the grown PtV nanorods have an average length in a range from 3 nm to 5 nm.

In an embodiment involving synthesis of a 4H/fcc heterophase hierarchical Au—PtTi heterostructure, the first mixture is formed by mixing the platinum(II) bis(acetylacetonate) and the titanium oxide acetylacetonate with a weight ratio in a range from 0.5 to 1. In this regard, the synthesis condition of a 4H/fcc heterophase hierarchical Au—PtTi heterostructure is similar to that of Au@PtV nanostructure, except the $V(acac)_3$ is replaced by the titanium oxide acetylacetonate and the reaction temperature is increased to 195° C. The Pt-based nanoisland including titanium can epitaxially grow from the Au nanorod so as to form a 4H/fcc heterophase hierarchical Au—PtTi heterostructure with the Au nanorod serving as a seed.

In some embodiments, the ascorbic acid added to the first mixture can be replaced by glucose with the same molar amount. In some embodiments, octadecylamine can also work as solvents. For example, at the stage of the preparation for the first mixture, oleylamine or 1-octadecen as described above can be replaced by octadecylamine with the same molar amount. The optional replacement of additives or solvents is implemented to improve the method's overall versatility and efficiency and made the synthesis process more flexible.

By the above configuration, the 4H/fcc hierarchical Pt-based heterostructure exhibits excellent catalytic performances toward electrochemical AOR under alkaline conditions. High mass activities of 8.33 and 6.12 $mg_{Pt}^{-1}$ towards MOR and EOR, respectively, are achieved on the 4H/fcc hierarchical Pt-based catalyst. The operando infrared reflection absorption spectroscopy reveals that the MOR on the same catalyst proceeds through both CO and formate pathways, exhibiting fast reaction kinetics.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

The invention claimed is:

1. A heterogeneous catalyst for alcohol oxidation reaction of an anode reaction in direct alcohol fuel cells, comprising:

at least one Pt-based nanoisland having a 4H/face-centered cubic (fcc) heterophase and deposited on and epitaxially grown from an Au nanorod by using a synthesis process, wherein the synthesis process comprises:

mixing a material A with a solvent B that comprises at least one selected from oleylamine and 1-octadecene to form a first mixture, wherein the material A is selected from the group consisting of platinum(II) bis (acetylacetonate), a combination of platinum(II) bis (acetylacetonate) and vanadium(III) acetylacetonate, and a combination of platinum(II) bis (acetylacetonate) and titanium oxide acetylacetonate;

adding a dispersion C comprising 4H/fcc Au nanorods into the first mixture to form a second mixture;

wherein an amount of the platinum(II) bis(acetylacetonate), an amount of the solvent B, and an amount of the dispersion C are positive, and a ratio of the amount of the platinum(II) bis(acetylacetonate) to the amount of the solvent B is in a range from 0.5 to 2, and a ratio of the amount of the platinum(II) bis(acetylacetonate) to the amount of the dispersion C is in a range from 2 to 6;

heating the second mixture at a temperature in a range from 150° C. to 200° C. for a time period in a range from 5 hours to 15 hours; and recovering a 4H/fcc Pt-based heterostructure with Au from the second mixture.

2. The heterogeneous catalyst of claim 1, wherein the Pt-based nanoisland forms a Pt shell with an average thickness in a range from 4.2 nm to 5.2 nm on the Au nanorod.

3. The heterogeneous catalyst of claim 1, wherein the Pt-based nanoisland comprises vanadium and forms a coating of a PtV shell with an average thickness in a range from 3.3 nm to 5.1 nm on the Au nanorod.

4. The heterogeneous catalyst of claim 1, wherein the Pt-based nanoisland comprises vanadium and extends vertically from the Au nanorod along a direction different than a longitudinal axis of the Au nanorod so as to form PtV nanorods on the Au nanorod.

5. The heterogeneous catalyst of claim 4, wherein the PtV nanorods have an average length of 3 nm to 5 nm.

6. The heterogeneous catalyst of claim 1, wherein the first mixture is formed by mixing the platinum (II) bis (acetylacetonate) and the vanadium (III) acetylacetonate with a weight ratio in a range from 0.5 to 1.

7. The heterogeneous catalyst of claim 1, wherein the first mixture is formed by mixing the platinum (II) bis (acetylacetonate) and the titanium oxide acetylacetonate with a weight ratio in a range from 0.5 to 1.

8. The heterogeneous catalyst of claim 1, wherein the first mixture is formed by using the solvent containing the oleylamine and the 1-octadecene.

9. The heterogeneous catalyst of claim 1, wherein the first mixture is formed by mixing the material A with ascorbic acid or glucose.

10. The heterogeneous catalyst of claim 1, wherein the synthesis process further comprises sonicating the first mixture.

11. The heterogeneous catalyst of claim 1, wherein the synthesis process further comprises adding tetraoctylammonium bromide and the dispersion C into the first mixture to form the second mixture.

12. The heterogeneous catalyst of claim 1, wherein the Pt-based nanoisland forms a 4H/fcc core-shell Au-Pt heterostructure with the Au nanorod serving as a seed.

13. The heterogeneous catalyst of claim 1, wherein the Pt-based nanoisland further comprises vanadium and forms a 4H/fcc core-shell Au—PtV heterostructure with the Au nanorod serving as a seed.

14. The heterogeneous catalyst of claim 1, wherein the Pt-based nanoisland further comprises titanium and forms a 4H/fcc core-shell Au—PtTi heterostructure with the Au nanorod serving as a seed.

15. The heterogeneous catalyst of claim 1, wherein the Pt-based nanoisland further comprises vanadium and forms a 4H/fcc heterophase hierarchical Au—PtV heterostructure with the Au nanorod serving as a seed.

16. The heterogeneous catalyst of claim 1, wherein the Pt-based nanoisland further comprises titanium and forms a 4H/fcc heterophase hierarchical Au—PtTi heterostructure with the Au nanorod serving as a seed.

17. The heterogeneous catalyst of claim 1, wherein the Pt-based nanoisland comprises a PtV alloy or a PtTi alloy.

* * * * *